US007228210B2

(12) United States Patent
Davis et al.

(10) Patent No.: US 7,228,210 B2
(45) Date of Patent: Jun. 5, 2007

(54) FUEL PUMP MONITORING SYSTEM AND ASSOCIATED METHOD

(75) Inventors: Brian J. Davis, Aurora, OH (US); Gary Kochis, Uniontown, OH (US); E. Kent Miller, Cincinnati, OH (US)

(73) Assignee: Argo-Tech Corporation, Cleveland, OH (US)

( * ) Notice: Subject to any disclaimer, the term of this patent is extended or adjusted under 35 U.S.C. 154(b) by 208 days.

(21) Appl. No.: 10/676,607

(22) Filed: Oct. 1, 2003
(Under 37 CFR 1.47)

(65) Prior Publication Data

US 2004/0148088 A1 Jul. 29, 2004

Related U.S. Application Data

(63) Continuation-in-part of application No. PCT/US03/14483, filed on May 6, 2003.

(60) Provisional application No. 60/415,186, filed on Oct. 1, 2002.

(51) Int. Cl.
*G06F 19/00* (2006.01)

(52) U.S. Cl. ........................... 701/29; 701/33; 340/438

(58) Field of Classification Search .................. 701/14, 701/29, 33, 35; 340/438, 439
See application file for complete search history.

(56) References Cited

U.S. PATENT DOCUMENTS 3,975,902 A 8/1976 Smith et al.
4,039,804 A 8/1977 Reed et al.
4,259,835 A 4/1981 Reed et al.
4,283,634 A 8/1981 Yannone et al.
5,069,071 A 12/1991 McBrien et al.
5,225,842 A 7/1993 Brown et al.
5,392,052 A 2/1995 Eberwine
5,485,491 A 1/1996 Salnick et al.

(Continued)

FOREIGN PATENT DOCUMENTS

WO WO 96/02903 2/1996

OTHER PUBLICATIONS

Ajax Smart Bolt B-N010 Innovation Data Sheet, Ajax Fasteners, Ajax Technology Centre, Victoria, Australia (4 pages).

(Continued)

*Primary Examiner*—Gary Chin
(74) *Attorney, Agent, or Firm*—Fay Sharpe LLP

(57) ABSTRACT

A fuel pump monitoring system (10) for monitoring fuel pumps (16) and a method for using the system are provided. The fuel pump monitoring system includes a display device (22), an information network (20), a data communication network (18), a monitoring device (12), and an information server (14). The monitoring device collects environmental parameters and operates independent from the vehicle. In one embodiment, the monitoring device uses GPS technology. The fuel pump information server provides fuel pump information and related information to a subscriber. In one embodiment, the monitoring device is in communication with an Iridium satellite constellation (28) and the information is displayed to the subscriber when the fuel pump is substantially anywhere in the world. In another embodiment, the display device is in communication with the Iridium satellite constellation and the information is displayed to the subscriber when the subscriber is substantially anywhere in the world, preferably via the Internet (36).

44 Claims, 13 Drawing Sheets

U.S. PATENT DOCUMENTS

| | | | | |
|---|---|---|---|---|
| 5,552,987 | A | 9/1996 | Barger et al. | |
| 5,798,458 | A | 8/1998 | Monroe | |
| 5,890,079 | A | 3/1999 | Levine | |
| 5,917,405 | A | 6/1999 | Joao | |
| 5,959,577 | A | 9/1999 | Fan et al. | |
| 5,974,349 | A | 10/1999 | Levine | |
| 6,009,356 | A | 12/1999 | Monroe | |
| 6,072,396 | A | 6/2000 | Gaukel | |
| 6,076,405 | A | 6/2000 | Schoess | |
| 6,121,922 | A | 9/2000 | Mohan | |
| 6,148,179 | A | 11/2000 | Wright et al. | |
| 6,157,317 | A | 12/2000 | Walker | |
| 6,259,372 | B1 | 7/2001 | Taranowski et al. | |
| 6,321,091 | B1 | 11/2001 | Holland | |
| 6,339,397 | B1 | 1/2002 | Baker | |
| 6,377,210 | B1 | 4/2002 | Moore | |
| 6,429,810 | B1 | 8/2002 | De Roche | |
| 6,456,852 | B2 | 9/2002 | Bar et al. | |
| 6,456,928 | B1 | 9/2002 | Johnson | |
| 6,472,976 | B1 | 10/2002 | Wohl | |
| 6,728,605 | B2 | 11/2002 | Lash et al. | |
| 6,496,777 | B2 | 12/2002 | Tennison et al. | |
| 6,502,030 | B2 | 12/2002 | Hilleary | |
| 6,509,867 | B1 | 1/2003 | McGibney | |
| 6,531,982 | B1 | 3/2003 | White et al. | |
| 6,533,316 | B2 | 3/2003 | Breed et al. | |
| 6,542,076 | B1 | 4/2003 | Joao | |
| 6,542,077 | B2 | 4/2003 | Joao | |
| 6,611,757 | B2 | 8/2003 | Brodie | |
| 6,700,493 | B1 | 3/2004 | Robinson | |
| 6,700,533 | B1 | 3/2004 | Werb et al. | |
| 6,738,697 | B2 * | 5/2004 | Breed | 701/29 |
| 6,789,013 | B2 | 9/2004 | Annett et al. | |
| 6,799,094 | B1 | 9/2004 | Vaida et al. | |
| 2002/0143447 | A1 | 10/2002 | Miller | |
| 2002/0177476 | A1 | 11/2002 | Chou | |
| 2003/0007473 | A1 | 1/2003 | Strong et al. | |
| 2003/0009270 | A1 * | 1/2003 | Breed | 701/29 |
| 2003/0030568 | A1 | 2/2003 | Lastinger et al. | |
| 2003/0117316 | A1 | 6/2003 | Tischer | |
| 2003/0225492 | A1 | 12/2003 | Cope et al. | |
| 2004/0183673 | A1 | 9/2004 | Nageli | |
| 2005/0125117 | A1 * | 6/2005 | Breed | 701/29 |
| 2005/0174235 | A1 * | 8/2005 | Davis et al. | 340/539.13 |

OTHER PUBLICATIONS

Smart Bolt—Single-Use Version, Sandia National Laboratories, Albuquerque, NM (1 page).

Smart Bolt—Reusable Version, Sandia National Laboratories, Albuquerque, NM (1 page).

* cited by examiner

FUEL PUMP MONITORING SYSTEM AND ASSOCIATED METHOD

This application claims the benefit of U.S. Provisional Patent Application Ser. No. 60/415,186, filed on Oct. 1, 2002, the disclosure of which is incorporated herein by reference. This application is a continuation-in-part of prior PCT patent application No. PCT/US03/14483, filed May 6, 2003.

BACKGROUND OF THE INVENTION

The invention relates to a system for monitoring a fuel pump and a method for using the system. It finds particular application in conjunction with monitoring one or more parameters associated with a fuel pump used in an aircraft and will be described with particular reference thereto. However, it is to be appreciated that the invention is also amenable to other applications. For example, monitoring fuel pumps used in ground vehicles and/or watercraft. Likewise, monitoring other types of components used in aircraft, ground vehicles, and/or watercraft.

In existing systems, maintenance of a fuel pump for an aircraft commonly occurs when the aircraft is at rest and at predetermined inspection intervals. A mechanic may visually inspect and take readings of the fuel pump while the aircraft is not flying and record these in either a paper entry journal or electronically. Similar practices are commonly used for monitoring fuel pumps in ground vehicles and watercraft. Likewise, similar practices are used for monitoring other types of components used in aircraft, ground vehicles, and watercraft. Drawbacks with such systems include inconsistent inspection analysis, since such inspections provide only a snapshot of the fuel pump during the inspection time. Some U.S. patents related to monitoring components used in aircraft, ground vehicles, and/or watercraft are identified below.

U.S. Pat. No. 5,069,071 to McBrien et al. discloses a vibration monitoring system employing a capacitive accelerometer that determines the energy associated with one or more frequency components within the frequency spectrum of the vibration signal. The capacitive accelerometer operates as a mixer due to its time varying capacitance which provides a measure of the vibration. When the accelerometer is excited by an AC signal the output from the accelerometer comprises beat frequencies due to the mixing of the time varying capacitance and the AC signal. By changing the frequency of the AC signal the location of the beat frequencies in the frequency domain of the accelerometer output can be shifted. Subsequent bandpass filtering to attenuate frequencies except those associated with the frequency component and demodulation to bandshift the energy of the filtered signal energy to DC, creates a DC value which provides a measure of the energy present at the frequency component.

U.S. Pat. No. 5,485,491 to Salnick et al. discloses an online system for diagnosing operability of a rotating electrical apparatus. The system includes sensors producing electrical variables corresponding to operating conditions of the apparatus, data converters for converting the electrical variables to digital values, a comparator for comparing the values to corresponding predetermined baseline values of the apparatus and producing a corresponding comparison value, and a signaling mechanism for outputting signals related to a period of predicted operability of the apparatus whenever the comparison value exceeds a corresponding predetermined deadband value. The operating conditions may be non-electrical operating conditions, such as a condition of a lubrication system or a bearing of the apparatus. Alternatively, the sensors may sense electrical insulation non-thermal parameters during operation of the apparatus, in order to produce signals related to the operability of an insulator of the apparatus. The system may have a local processor for performing the comparisons and signaling. Alternatively, the system may include an intermediate data storage and communication mechanism for storing and communicating the sensed values to a remote processor. The processor may also trend the values with respect to time and determine a derivative of a sensed value. The apparatus may be a motor operating in a hazardous environment, such as a reactor coolant pump (RCP) motor operating in a nuclear containment vessel.

U.S. Pat. No. 5,552,987 to Barger et al. discloses a maintenance interval indication system. An apparatus and method are provided that are cost-effective for general aviation aircraft and that may be retrofitted to existing airplanes. The system includes an onboard aircraft cycle counter and engine run-time and flight time logging instrument that requires no external transducers, no electrical signal inputs and only a single electrical power input from an airframe's electrical system. A microprocessor in the engine cycle logger accepts data input from an acoustic transducer and from a pressure transducer (i.e., altimeter), and correctly logs engine cycles in spite of factors such as: a) touch-and-go landings; b) in-flight engine shutdowns; c) noise from another engine on the same aircraft: d) wide variations in acoustic input levels from one engine to the next; e) changes in acoustic level following an overhaul of the monitored engine; f) transient noise artifacts; and g) transient altitude artifacts. Data from the cycle logging unit are communicated to a portable data collection device for subsequent off-board processing.

U.S. Pat. Nos. 5,890,079 and 5,974,349 to Levine disclose a remote aircraft flight recorder and advisory system that monitors many performance parameters and many aircraft operational parameters and broadcasts this information along with aircraft identification, audio, video, global positioning, and altitude data, to a world wide two-way radio frequency (RF) network. This information is monitored and recorded at a remote, centralized location. At this location, this information is combined with archived data, ATC data, weather data, topological data, map data, and manufacturers' data. Analysis of this combined data allows identification of problems and generation of advisories. Six types of advisories are generated: maintenance, safety of flight, flight efficiency, flight separation, safe to fly and safe to take off. In the event of a crash the remotely recorded data provides an instant indication of the cause of the crash as well as where the crashed plane can be found. Use of the Levine device allows replacement of the current, onboard flight data recorders thus saving costs and weight. Having the recorded data at a remote site eliminates the need to search for flight data recorders. Other advantages are back-up for ATC radar position data, better control of aircraft separation, improved flight efficiency, and allowing use of simpler and lower power radar.

U.S. Pat. No. 6,009,356 to Monroe discloses awireless safety and surveillance recorder system for aircraft incorporates a plurality of strategically spaced wireless sensors for monitoring critical components and operational characteristics of the aircraft. The captured data and a wireless image are transmitted to a monitor in the cockpit and recorded on a "black box" flight recorder, and may be transmitted to ground control stations for real-time or near real-time surveillance. The system may include a second recorder for providing redundancy and may include redundant sensors.

U.S. Pat. No. 6,148,179 to Wright et al. discloses a wireless spread spectrum ground link-based aircraft data communication system for engine event reporting and an associated method. The system and method provide a record of the flight performance of an aircraft and the performance of the engine. A plurality of sensors sense engine conditions and generate engine data. A ground data link unit is positioned within the aircraft and receives the engine data. At initial take-off, a spread spectrum transmitter downloads the engine data to an airport based spread spectrum receiver that receives the spread spectrum communication signal from the aircraft upon initial take-off and demodulates the spread spectrum communication signal to obtain the engine data after initial take-off. The ground data link unit can also include a data store that is operative to accumulate and store flight performance data during flight of the aircraft. The spread spectrum transceiver is coupled to the data store and can download the flight performance data after the aircraft has landed at its destination airport.

U.S. Pat. No. 6,456,928 to Johnson discloses a prognostics monitor for systems that are subject to failure and an associated method. The monitor and method are for detecting and predicting parameter deviations and isolating failure modes in systems that are subject to failure. In a preferred embodiment, the method provides for use of the monitor with engines, including aircraft, automobile, and industrial combustion engines. However, numerous other applications are contemplated. Such engines may be described as having monitor points having current parameter values, where the monitor points may correspond to single physical sensors or to virtual or inferred monitor points having parameter values derived from multiple sensors. Acceptable ranges, limits, and values for each of the monitor point parameters may be provided for use with the Johnson device. Parameters lying outside of the acceptable ranges may be said to be in deviation. Ambiguity groups, including one or more failure modes or physical causes of the parameter deviations may also be provided. Parameter deviations, after optional filtering, may generate deviation signals which may be followed by analysis of the ambiguity groups to isolate the failure mode or modes causing the deviation. Courses of engine operation ameliorating the failure mode may be suggested. The methods also provides for projecting current trends into the future to predict deviations and isolate failure modes early, prior to actual occurrence. One preferred use for the method is early detection and isolation of faults in aircraft engines, leading to corrective action including early preventative maintenance.

U.S. Pat. No. 6,542,077 to Joao discloses a monitoring apparatus for a vehicle or a premises, including a monitoring device for monitoring operation, system status, equipment system status, or activity, or a device for detecting a state of disrepair of a system or equipment system. The monitoring device or device is located at the vehicle or premises. The monitoring device or device transmits data to a first processing device located remote from the vehicle or premises. The data is received by the first processing device. The first processing device is capable of transmitting the data to a second processing device located remote from the vehicle or premises and remote from the first processing device. The second processing device is capable of receiving the data. The data can include operational data and video information, or information regarding a state of disrepair of the system or equipment system.

U.S. patent application Publication No. 2002/0143447 discloses a diagnostic system for use onboard a vehicle. The diagnostic system comprises a data recorder for collecting data from various sensors throughout the vehicle. An interface module is provided at the output of the data recorder and is capable of transmitting data over transmission medium to an output device for use in diagnosing vehicle performance and/or component failure.

PCT Patent Application Publication No. WO 96/02903 discloses a smart bolt device having a communications system in a separate housing from a bolt. The device provides a hot bearing detection system that spatially separates the thermal sensor that is disposed within a bearing-securing bolt from the communication means for communicating high temperature conditions occurring at a railroad car bearing or the like. The housing for the communication means is disposed adjacent the bearing and is connected electrically with the thermal sensor such that when high temperature conditions occur the conditions will be RF-communicated to the wayside or to a locomotive.

The inventors have determined that it would be beneficial to provide a system that monitors a fuel pump or another type of equipment/component used in conjunction with an aircraft, ground vehicle, watercraft, or other type of vehicle in order to provide predictive and anticipatory actions to increase the reliability of the fuel pump and/or the vehicle. An added benefit is that the system also provides an independent source for verifying component, equipment, and/or vehicle operating hours and/or operation under stressed conditions.

SUMMARY OF THE INVENTION

In one aspect of the invention, an apparatus for monitoring a component associated with a vehicle is provided. The apparatus includes a display device external to the vehicle for displaying information associated with the monitoring, and a monitoring device in operative communication with the display device and disposed within an operative vicinity of the component being monitored for selectively sensing at least one environmental parameter associated with the component being monitored and selectively communicating data associated with the monitoring to the display device. The display device and the monitoring device are electrically isolated from the vehicle and the component being monitored and inoperative from equipment associated with the vehicle.

In another aspect of the invention, a fuel pump monitoring system is provided. The fuel pump monitoring system includes a display device for displaying fuel pump information associated with a fuel pump to be monitored, a data communication network, a monitoring device disposed within an operative vicinity of the fuel pump for selectively sensing at least one environmental parameter associated with the fuel pump for selectively transmitting data associated with the fuel pump via the data communication network, and a component information server for command and control of the monitoring device. The fuel pump is used in conjunction with a vehicle, a fuel pump information network in communication with the display device for communicating the information to the display device. The monitoring device receives command and control information via the data communication network. The component information server selectively transmits command and control information to the monitoring device via the data communication network. The component information server receives the data associated with the fuel pump from the monitoring device via the data communication network. The component information server selectively receives command and control information from the display device via the component information network. The component information server selectively processes the data associated with the fuel pump to produce the fuel pump information. The fuel pump information is selectively accessible to the display device via the component information network.

In still another aspect of the invention, a method for monitoring a fuel pump associated with a vehicle and providing fuel pump information to a subscriber is provided The method includes: a) associating the subscriber with a monitoring device and the monitoring device with the fuel pump, b) granting the subscriber using a display device access to a Web site via a component information network, c) receiving position and time data from at least four global positioning system satellites of a global positioning system satellite constellation at the monitoring device, the position data representing a position of each global positioning system satellite from which data was received with respect to center of Earth and the time data representing a time of day associated with the position data, d) sensing at least one environmental parameter associated with the fuel pump, e) communicating the environmental parameter, position, and time data to a component information server via a data communication network, f) processing the position and time data in a trilateration fashion to produce XYZ and time data, the XYZ data representing a latitude, a longitude, and an altitude, respectively, and the time data representing a time of day associated with the XYZ data, g) displaying the environmental parameter, XYZ, and time data on the at least one Web page and overlaying a symbol on the map at a coordinate associated with the XYZ data, and h) repeating steps c) through g) for a predetermined time at a predetermined interval. The monitoring device is disposed in an operative vicinity of the fuel pump at a location in which the monitoring device can receive position and time data from multiple global positioning system satellites and sense at least one environmental parameter associated with the fuel pump during normal operation of the vehicle. The monitoring device is electrically isolated from the vehicle and the fuel pump and inoperative from equipment associated with the vehicle. The Web site includes at least one fuel pump information Web page that displays a map suitable for monitoring environmental parameter, position, and time data associated with the fuel pump.

In one embodiment of the method, the data communication network includes includes a PSTN, an Iridium satellite constellation, and an Iridium satellite/PSTN gateway in communication with the PSTN and the Iridium satellite constellation. The monitoring device is in communication with the Iridium satellite constellation and the tracking information is displayed to the subscriber at the display device when the fuel pump is substantially anywhere in the world with line of sight access to the sky.

In another embodiment of the method, the fuel pump information network includes an Internet, an Iridium satellite constellation, and an Iridium satellite/Internet gateway in communication with the Internet and the Iridium satellite constellation. The display device is in communication with the Iridium satellite constellation and the tracking information is displayed to the subscriber at the display device when the subscriber is substantially anywhere in the world.

Benefits and advantages of the invention will become apparent to those of ordinary skill in the art upon reading and understanding the description of the invention provided herein.

BRIEF DESCRIPTION OF THE DRAWINGS

The invention is described in more detail in conjunction with a set of accompanying drawings.

DETAILED DESCRIPTION OF THE PREFERRED EMBODIMENT

Figure 1:
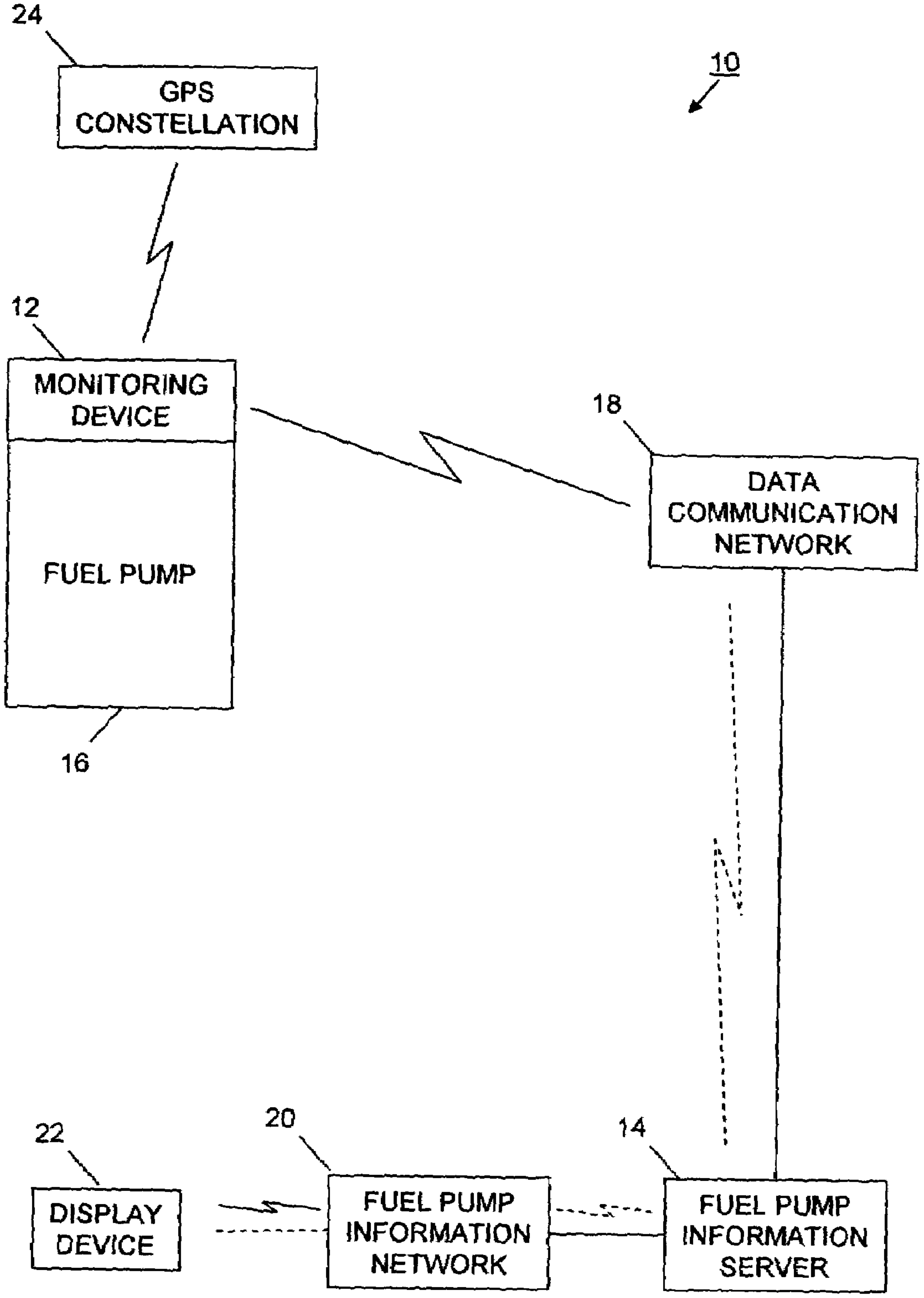
FIG. 1 is a block diagram of an embodiment of a fuel pump monitoring system incorporating the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

With reference to FIG. 1, an embodiment of a fuel pump monitoring system 10 includes a monitoring device 12, a fuel pump information server 14, a fuel pump 16, a data communication network 18, a fuel pump information network 20, a display device 22, and, optionally, a GPS satellite constellation 24. The monitoring device 12 includes one or more environmental sensors to detect and/or measure certain environmental parameters associated with the fuel pump. The one or more environmental sensors may include, for example, any combination of one or more vibration sensors, one or more temperature sensors, one or more strain gauges, and one or more other type of environmental sensor to sense, for example, voltages, pressures, and other quantifiable parameters.

If the fuel pump monitoring system 10 uses the GPS satellite constellation 24, the GPS satellite constellation 24 is preferably a public GPS satellite constellation including a plurality of GPS satellites 240 (FIG. 3) orbiting the Earth. Each GPS satellite includes a clock and has an understanding of its own orbit with respect to the center of the Earth. Each GPS satellite continually broadcasts its position with respect to the center of the Earth and time with respect to a time of day reference. GPS satellites are well known for enabling users with GPS receivers to locate their positions on or near the Earth. Such systems are commonly used for navigation in many different applications, such as aviation, nautical travel, automobile travel, etc. Preferably, the GPS satellite constellation 24 includes enough GPS satellites and the satellites are spaced apart so that from any point on Earth, four GPS satellites will be above the horizon. Equipment with a GPS receiver can determine its position with respect to the center of the Earth in longitude, latitude, and altitude from position and time data from four GPS satellites. If position and time data is received from three GPS satellites, the equipment can determine its position in longitude and latitude. The equipment can also determine its velocity from the position and time data.

One public GPS satellite constellation is the NAVSTAR GPS satellite constellation developed by the U.S. Department of Defense. The NAVSTAR GPS satellite constellation includes 27 GPS satellites (24 operational, 3 spare) orbiting at about 12,000 miles (19,300 km). The GPS satellites are dispersed around six planes with at least four GPS satellites in each plane. The orbits are arranged so that at any time anywhere on Earth, there are at least four GPS satellites above the horizon. Preferably, the GPS satellite constellation 24 is the NAVSTAR GPS satellite constellation. However, the fuel pump monitoring system 10 works just as well with any other public GPS satellite constellation, such as the GLONASS satellite constellation maintained by the Russian Federation or the Galileo satellite constellation introduced by European countries. The GPS satellite constellation 24 could also be a private satellite system.

The fuel pump 16 is typically an operational fuel pump on board a transport vehicle, such as an aircraft, ground vehicle, or watercraft. However, the monitoring device 12 may be secured to fuel pumps on other types of vehicles. Examples of transport vehicles include a truck, a van, an automobile, a cargo container, a trailer, a bus, a train, a locomotive, a rail car, and a watercraft. In the embodiment being described, the monitoring device 12 monitors the fuel pump. However, if monitoring of another type of equipment/component on such a transport vehicle is desired, the monitoring device 12 may be secured to the equipment/component for which monitoring is desired. Examples of other types of equipment/components that could be monitored include engines, landing gear, wheels, bearings, transmissions, frame and body components, drive train system components, exhaust system components, fuel system components, combustion system components, and similar vehicle components.

In the embodiment being described, the monitoring device 12 is secured to the fuel pump 16 in a manner so that it can communicate with GPS and/or communication satellites orbiting the Earth. Preferably, the monitoring device 12 is removably secured to a top-side exterior of the fuel pump 16 at its highest point. However, any point with line of sight access to at least three or four GPS satellites is suitable if collection of position data is desired. Access to at least four GPS satellite is required if collection of position data including altitude data is desired. Preferably, the monitoring device 12 positioned on the fuel pump 16 so that no operators, crew, or passengers can access the monitoring device 12 during normal operation of the vehicle. This may prevent terrorists and other foes from being able to remove or disable the monitoring device 12. Preferably, the monitoring device 12 is independently powered and electrically isolated from the vehicle and does not require manual intervention during normal operation of the fuel pump monitoring system 10. Again, this feature may prevent terrorists and other foes from being able to disable the monitoring device 12.

As long as the monitoring device 12 has line of sight access to the sky, it selectively receives wireless communications that are continuously broadcast by the GPS satellite constellation 24. The wireless communications include the position and time data continuously broadcast by each of multiple GPS satellites 240 (FIG. 3) that are within line of sight of the monitoring device 12. The monitoring device 12 combines the position and time data from each of the multiple GPS satellite to form combined position and time data.

The one or more environmental sensors associated with the monitoring device 12 provide the monitoring device 12 with sensor data. The monitoring device 12 combines the sensor data with the combined position and time data to form fuel pump data.

The monitoring device 12 is in communication with the fuel pump information server 14 via the data communication network 18 and selectively transmits the fuel pump data to the fuel pump information server 14. Preferably, with respect to the data communication network 18 and the fuel pump information server 14, the monitoring device 12 is a thin client using TCP/IP protocol.

The monitoring device 12 determines whether or not to receive the position and time data and/or sensor data based on command and control information from the fuel pump information server 14. Similarly, the monitoring device 12 determines whether or not to transmit the fuel pump data based on command and control information from the fuel pump information server 14. Additionally, the monitoring device 12 may use the environmental sensor(s) and/or preprogrammed instructions to determine whether or not to receive the position and time data and/or sensor data. Similarly, the monitoring device 12 may include preprogrammed instructions to determine whether or not to transmit the fuel pump data. Moreover, the monitoring device 12 may use the environmental sensor in conjunction with the preprogrammed instructions to determine whether or not to transmit the fuel pump data. The monitoring device 12 may store the fuel pump data for subsequent transmission.

The monitoring device 12 may include an algorithm to resolve the position and time data for its own position with respect to the center of the Earth. The algorithm generates XYZ data representing latitude, longitude, and altitude (requiring position and time data from at least four GPS satellites) or XY data representing latitude and longitude (requiring position and time data from at least three GPS satellites) in a trilateration fashion depending on the type of position information desired. Time data associated with XYZ or XY data is also generated. The resolution of the resolving algorithm is about 18 inches in latitude (X), about 18 inches in longitude (Y), and about 18 inches in altitude (Z). If the resolving algorithm is implemented in the monitoring device 12, the combined position and time data includes XYZ or XY data and the associated time data. Typically, the resolving algorithm reduces the amount of data transmitted to the fuel pump information server.

The monitoring device 12 may include a data compression process to further reduce the amount of time required for fuel pump data transmissions. The monitoring device 12 may include encryption and decryption processes for secured communications with the fuel pump information server 14. As another alternative, the monitoring device 12 may include the encryption process to secure the fuel pump data transmissions. This may prevent terrorists and other foes from using the fuel pump data to locate and/or target the vehicle.

Communications between the monitoring device 12 and the data communication network 18 are wireless. Communications between the fuel pump information server 14 and the data communication network 18 are preferably by wire. However, this communication may also be wireless. The data communication network 18 may implement any combination of wireless and wired communication technologies suitable for communications between the monitoring device and the fuel pump information server 14. The data communication network 18 may be a public network, a private network, or any combination of public and private networks.

For example, the data communication network 18 may include one or more of data communication satellite systems, terrestrial telephone systems, cable television systems, computer networks, and other suitable data communication networks in any combination. The data communication satellite system may include a satellite telephone system or a private satellite network. The satellite telephone system may be any public satellite telephone system, such as the Iridium satellite system, the Globalstar satellite system, the Orbcomm satellite system, the Inmarsat satellite system, or any other suitable public satellite telephone system. The terrestrial telephone system may include any combination of land line or wireless telephone systems, such as the public switched telephone network (PSTN), broadband integrated services digital network (ISDN), digital subscriber line (DSL), cellular telephone network, personal communication system (PCS) network, or any other suitable terrestrial telephone network. The computer network may include any combination of wire line local area networks (LANs) and wireless LANs. Preferably, the computer network is Ethernet (i.e., IEEE 802.3 for wire line LAN and IEEE 802.11 for wireless LAN). However, any other suitable network communication protocols may be implemented, such as token ring, fiber distributed data interface (FDDI), ARCNET, and HiperLAN.

These various communication technologies may be combined in any combination to form a wide area network (WAN) or a metropolitan area network (MAN). Notably, the wireless communication between the monitoring device 12 and the data communication network may be implemented by satellite, cellular telephone, PCS, wireless LAN, or any other suitable wireless technology.

The fuel pump information server 14 selectively provides command and control information to the monitoring device 12 and receives the fuel pump data from the monitoring device 12. The fuel pump information server 14 selectively processes the fuel pump data and selectively generates certain fuel pump information for monitoring the operational status of the fuel pump 16. The fuel pump information server 14 selectively makes the fuel pump information accessible to an authorized user of the display device 22 via the fuel pump information network 20. The authorized user, for example, may be a subscriber, an employee assigned to monitor the fuel pump, or an operator/administrator associated with the fuel pump information server 14. The fuel pump information server 14 may also selectively receive command and control information from an authorized user of the display device 22. Preferably, the fuel pump information server 14 is compatible with data communications via the data communication network 18 and the fuel pump information network 20 in TCP/IP protocol.

The fuel pump information server 14 may include preprogrammed instructions to determine: i) whether or not to provide commands or control information to the monitoring device 12, ii) whether or not to process the fuel pump data, iii) whether or not to generate fuel pump information and what type of fuel pump information to generate, iv) whether or not a user is authorized, v) whether or not to make fuel pump information accessible to an authorized user, and vi) whether or not to receive commands or control information from an authorized user. Other types of preprogrammed instructions are also possible. The preprogrammed instructions may be initially configured, edited, and/or supplemented by an authorized user of the display device 22. Some of the preprogrammed instructions may be initially configured, edited, and/or supplemented, while the fuel pump monitoring system 10 is monitoring the fuel pump 16.

The commands received from a user may include monitoring device commands to begin receiving position and time data, begin receiving sensor data, begin combining position and time data, begin combining sensor data with combined position and time data, begin transmitting fuel pump data, stop transmitting fuel pump data, stop combining sensor data with combined position and time data, stop combining position and time data, stop receiving sensor data, and stop receiving position and time data. Commands received from a user may also include fuel pump information server commands to begin processing fuel pump data, to begin generating certain types of fuel pump information, to stop generating certain types of fuel pump information, and to stop processing fuel pump data. Other types of commands are also possible.

The control information may include a monitoring device profile, a link from the monitoring device to the fuel pump, links from the fuel pump to elements associated with the fuel pump, and link information associated with either the fuel pump or an element of the fuel pump. Additional information may also be included in the monitoring device profile, such as voltages, pressures, and temperatures but not limited to any other quantifiable parameter that can be sensed by the monitoring device and included in the data stream.

Typically, the monitoring device profile is tailored to the type of fuel pump being monitored and the fuel pump information services contracted for by a subscriber. The monitoring device profile may, for example, specify real-time monitoring, monitoring on certain detected events, periodic monitoring, and/or monitoring on command. Additionally, the monitoring device profile may include thresholds associated with detected events, types of fuel pump information authorized for monitoring, and types of fuel pump information reports authorized. More specifically, the monitoring device profile may include: i) fuel pump information to be monitored and frequency, ii) vibration thresholds associated with engine startup and shutdown, iii) vibration thresholds associated with normal vehicle movement, iv) high stress conditions, v) fuel and fuel consumption information, and vi) reports to be processed and report frequency. Additional information may also be included in the monitoring device profile.

Typically, the monitoring device 12 includes monitoring device identification data that is embedded with communications to the fuel pump information server 14. This is how the fuel pump information server 14 identifies the fuel pump data, particularly when multiple monitoring devices 12 are communicating with the fuel pump information server 14. The link from the monitoring device 12 to the fuel pump 14 allows the fuel pump information server to associate the fuel pump data with the fuel pump so that the fuel pump information can reference the appropriate fuel pump. For example, the monitoring device identification data may be linked to a fuel pump serial no. Similarly, the fuel pump data can also be associated with an element of the fuel pump by the additional link from the fuel pump to the element. For example, an element can be a component of the fuel pump and/or a higher level equipment item with which the fuel pump is associated (e.g., engine, vehicle, etc.). The first link may associate the monitoring device identification data with the fuel pump serial no. and the second link may associate the fuel pump serial no. with the aircraft tail no. Additional examples of elements include operators, crew member, vehicle owner, fuel pump manufacturer, engine manufacturer, and vehicle manufacturer. Other types of elements are also possible. Multiple elements can be identified and linked to a given fuel pump.

Link information is descriptive information associated with a link For example, i) fuel pump identification data, ii) fuel pump certification, iii) fuel pump operational information, iv) fuel pump maintenance information, v) element identification data, vi) element certification, vii) element operational information, and viii) element maintenance information. Other types of link information are also possible.

The preprogrammed instructions in either the fuel pump information server 14 or the monitoring device 12 may include any combination of the various types of control information. Likewise, the commands are typically included in the preprogrammed instructions so that, as certain events are detected or as certain sequences occur, the commands can be communicated automatically.

The fuel pump information server 14 may include the algorithm to resolve position and time data for the monitoring device 12 from raw GPS position and time data included in the fuel pump data. The algorithm generates XYZ data representing latitude, longitude, and altitude (requiring position and time data from at least four GPS satellites) or XY data representing latitude and longitude (requiring position and time data from at least three GPS satellites) in the same manner as described above if the resolving algorithm is performed in the monitoring device 12. The algorithm also generates time data associated with XYZ or XY data.

The fuel pump information server 14 may include a data decompression process to decompress compressed fuel pump data transmissions. The fuel pump information server 14 may include encryption and decryption processes for secured communications with the monitoring device 12. As another alternative, the fuel pump information server 14 may include the decryption process to decrypt secure fuel pump data transmissions.

The fuel pump information network 20 may implement any combination of wireless and wired communication technologies suitable for communications between the fuel pump information server 14 and the display device 22. Preferably, communications between the fuel pump information network 20 and the fuel pump information server 14 and between the fuel pump information network 20 and the display device 22 are both by wire. However, either of these communications may be wireless or both may be wireless. Like the data communication network 18, the fuel pump information network 20 may be a public network, a private network, or any combination of public and private networks. As such, the networks identified above for the data communication network 18 may also be implemented in the fuel pump information network 20. Notably, the fuel pump information network 20 may include the Internet, which is accessible through each of the major communication systems identified above. The fuel pump information network 20 and the data communication network 18 may be linked together forming a common data communication network.

The display device 22 is any type of device suitable for communicating with the fuel pump information server 14 and displaying the fuel pump information. For example, a personal computer, a notebook computer, a personal digital assistance, a wireless personal digital assistance, a cellular telephone, a satellite telephone, a pager, or any other suitable display device. Preferably, the fuel pump information server 14 provides fuel pump information via a Web server connected to the Internet with suitable security measures. Accordingly, the display device 22 preferably has access to the Internet for receiving the fuel pump information and monitoring operational status of the fuel pump. However, the public Internet is not required for communications between the display device 22 and the fuel pump information server 14. Other alternatives include communications through a private network or one-to-one dial-up-type connections through a public network.

While FIG. 1 depicts a fuel pump monitoring system 10 with one monitoring device 12 and one display device 22, the system can be expanded to include multiple monitoring devices and/or multiple display devices. Use of multiple monitoring devices allows a user to monitor multiple fuel pumps, such as fuel pumps in a related combination of vehicles or operational fuel pumps related to each other, for example, by manufacturer. Use of multiple display devices allows multiple users to monitor a fuel pump. For example, a fuel pump in an aircraft can be monitored by various users associated with the fuel pump, as well as users associated with the aircraft, and government regulatory agencies. Of course use of both multiple monitoring devices and multiple display devices provides a combination of additional scenarios.

Preferably, the fuel pump information server 14 is housed in a single facility. However, it may be distributed among multiple facilities and networked together. Preferably, the fuel pump information server 14 is a ground-based system. However, other types of platforms are possible, such as an airborne platform or a ship-based platform.

In another embodiment of the fuel pump monitoring system 10, the display device 22 and the monitoring device 12 communicate directly. In this embodiment, the data communication network 18, fuel pump information server 14, and fuel pump information network 20 are not required. Communication between the display device 22 and the monitoring device 12 may be wireless or by wire. If such communication is wireless, it is typically low-powered RF or IR. If such communication is by wire, the monitoring device 12 includes connector to which the display device 22 is connected via a cable. Various processes described above with respect to the fuel pump information server 14 may be implemented within the monitoring device 12. Moreover, such processes may alternatively be implemented within the display device 22. Of course, certain process(es) described above with respect to the fuel pump information server 14 may be implemented within the monitoring device 12, while other process(es) described above with respect to the fuel pump information server 14 may be implemented within the display device 22.

Figure 2:
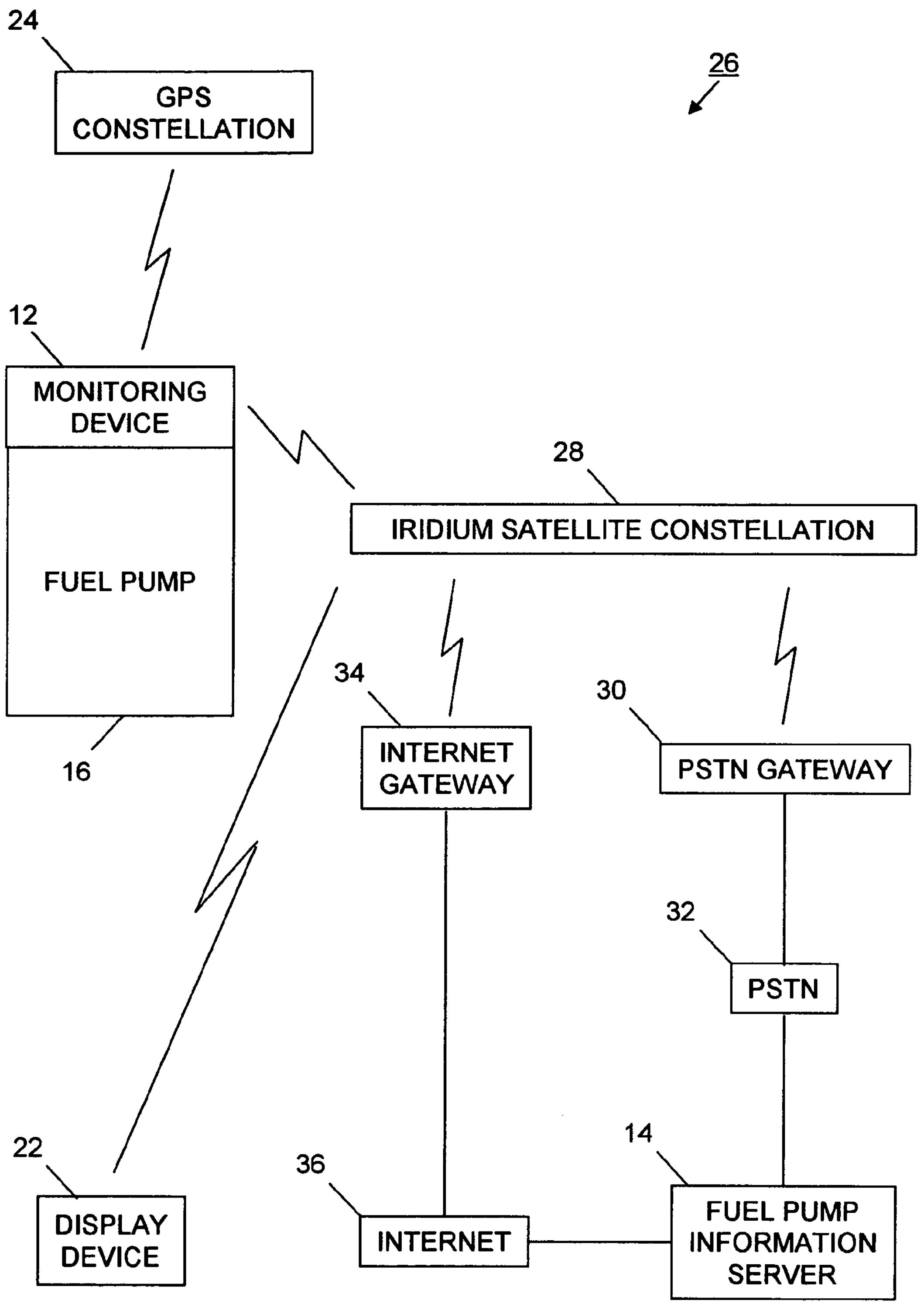
FIG. 2 is a block diagram of an embodiment of a global fuel pump monitoring system incorporating the invention.

With reference to FIG. 2, an embodiment of a global fuel pump monitoring system 26 includes the monitoring device 12, the fuel pump information server 14, the fuel pump 16, the display device 22, the GPS satellite constellation 24, an Iridium satellite constellation 28, an Iridium satellite/PSTN gateway 30, a PSTN 32, an Iridium satellite/Internet gateway 34, and an Internet 36. The monitoring device 12, fuel pump information server 14, fuel pump 16, display device 22, and GPS satellite constellation 24 are as described above in reference to FIG. 1. Moreover, as discussed above, use of the GPS satellite constellation 24 is optional.

A global implementation of the fuel pump monitoring system 26 is provided by a data communication network 18 (FIG. 1) and a fuel pump information network 20 (FIG. 1) that provide global coverage (i.e., worldwide communications). The data communication network 18 (FIG. 1) is provided by a satellite telephone system and a terrestrial telephone network. As shown, the preferred satellite telephone system is the Iridium telephone system. However, other satellite telephone systems that provide global coverage may also be implemented in the global fuel pump monitoring system 26. The preferred terrestrial telephone network is the PSTN. However, other types of terrestrial telephone networks may be implemented. More specifically, the data communication network 18 (FIG. 1) is provided by the Iridium satellite constellation 28, the Iridium satellite/PSTN gateway 30, and the PSTN 32.

In the embodiment being described, the fuel pump information network 20 (FIG. 1) is provided by a satellite telephone system and the Internet 36. As shown, the preferred satellite telephone system is the Iridium telephone system. However, other satellite telephone systems that provide global coverage may also be implemented in the global fuel pump monitoring system 26. More specifically, the fuel pump information network 20 (FIG. 1) is provided by the Iridium satellite constellation 28, the Iridium satellite/Internet gateway 34, and the Internet 36.

Global coverage of the monitoring device 12 secured to the fuel pump is provided by the Iridium satellite system. Likewise, global access to the fuel pump information by a subscriber/client user at the display device is provided by the Iridium satellite system. In an additional embodiment of a global fuel pump monitoring system, if global access is not required, the fuel pump information network 20 (FIG. 1) may implement other communication networks that provide regional or local access to the fuel pump information server 14 while the data communication network 18 provides global coverage. Conversely, in an another embodiment of a global fuel pump monitoring system, if global monitoring is not required, the data communication network 18 (FIG. 1) may implement other communication networks that provide regional or local monitoring of the fuel pump while the fuel pump information network 20 provides global coverage.

Figure 3:
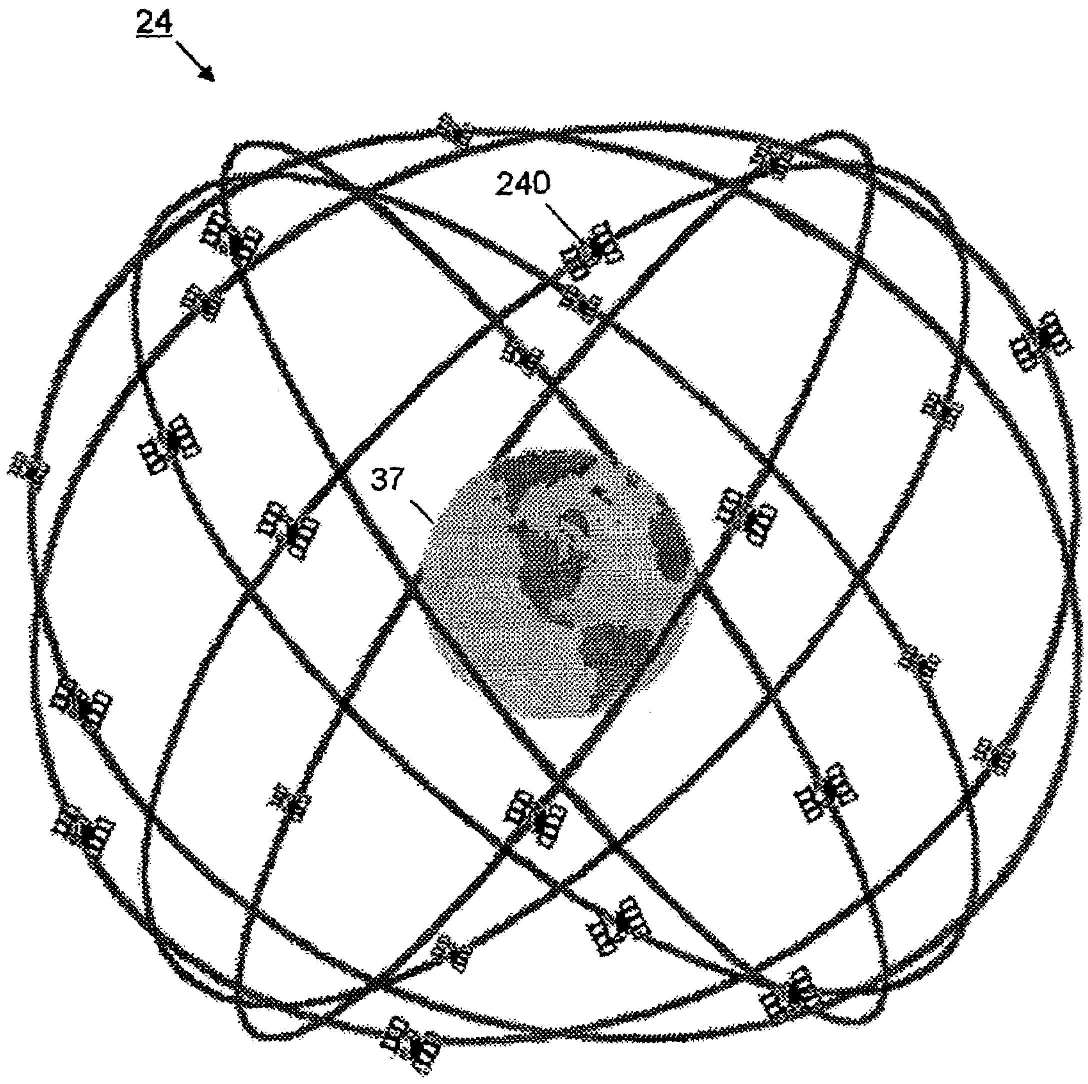
FIG. 3 depicts a GPS satellite constellation with multiple satellites in Earth orbit.

With reference to FIG. 3, the GPS satellite constellation 24 includes multiple GPS satellites 240 orbiting Earth 37.

Figure 4:
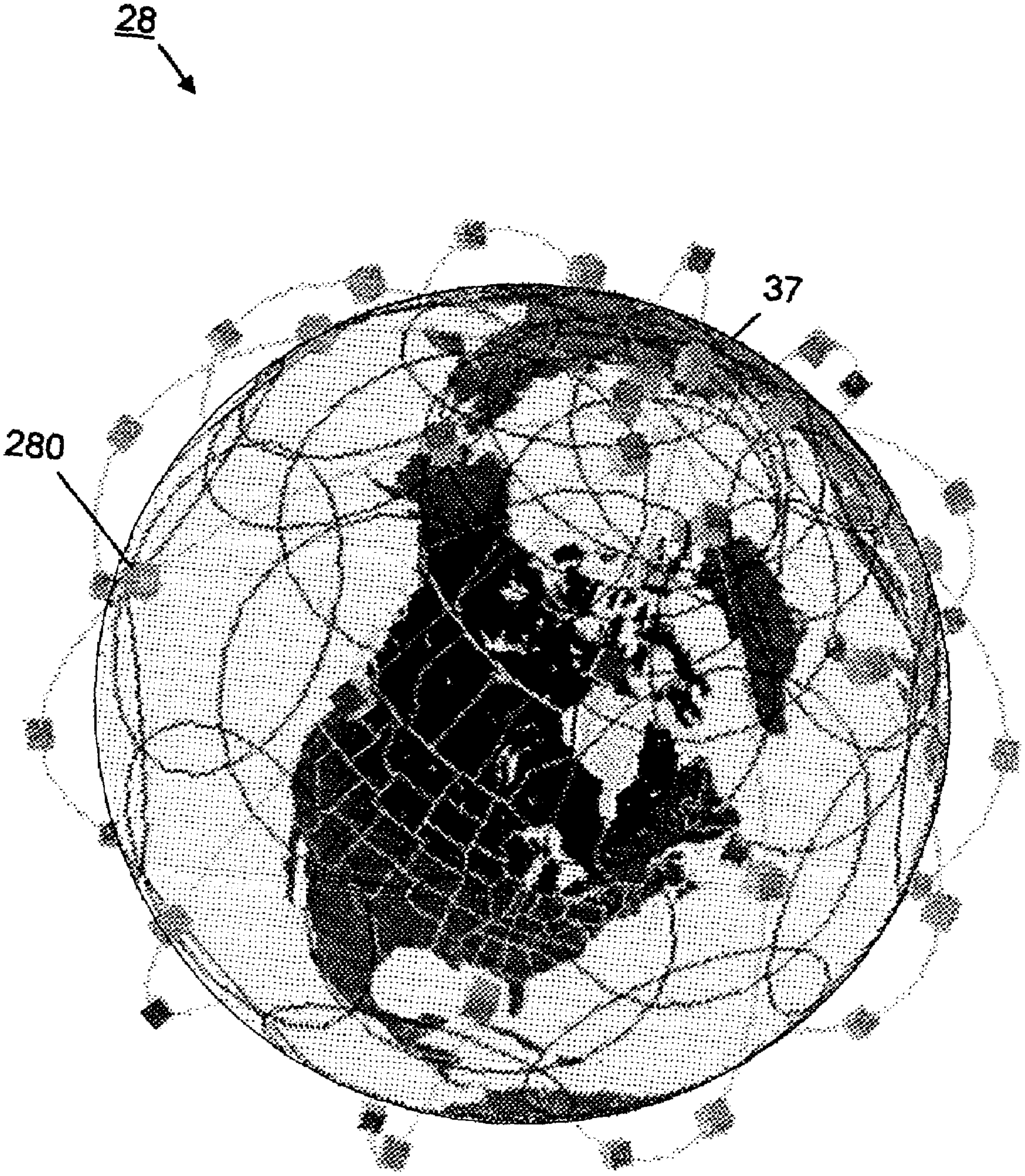
FIG. 4 depicts an Iridium satellite constellation with multiple satellites in Earth orbit.

With reference to FIG. 4, the Iridium satellite constellation 28 includes 66 Iridium satellites 280 orbiting Earth 37 in low Earth orbit (LEO) at an average altitude of 420 miles (670 km). The Iridium satellites 280 lie in six (6) orbital planes, with eleven (11) satellites per orbital plane. Within the Iridium satellite system, the Iridium satellites 280 communicate with Iridium telephones (i.e., radio transceivers or two-way radios) and gateways to terrestrial land line and wireless telephone systems, as well as gateways to the Internet. Notably, with the Internet gateway, the Iridium satellite system is an Internet service provider (ISP). Worldwide voice, data, and Internet services over the Iridium satellite system are provided by Iridium Satellite LLC.

Figure 5:
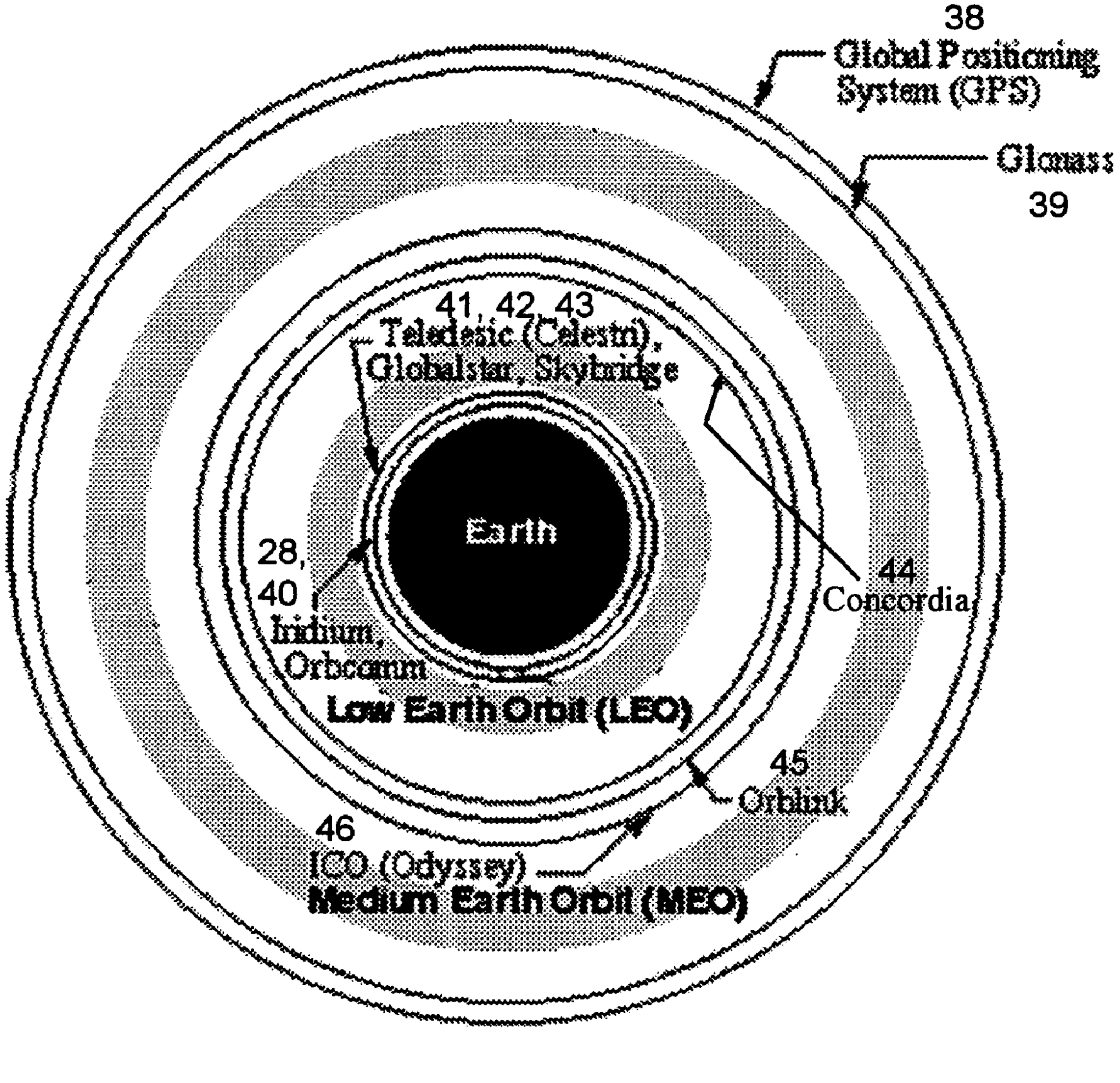
FIG. 5 illustrates orbital altitudes of various satellite constellations.

With reference to FIG. 5, the altitude of exemplary data communication satellite constellation orbits are illustrated. The Iridium satellite constellation 28, an Orbcomm satellite constellation 40, a Teledesic satellite constellation 41, a Globalstar satellite constellation 42, and a Skybridge satellite constellation 43 orbit Earth 37 at LOE. A Concordia satellite constellation 44, an Orblink satellite constellation 45, and an ICO satellite constellation orbit at a medium Earth orbit (MEO). A NAVSTAR GPS satellite constellation 38 and a Glonass satellite constellation 39 orbit Earth at a higher altitude. FIG. 5 illustrates various orbital altitudes for satellite constellations that may be used to implement the present application. By use of one or more of these satellite systems, the intended operations are obtained as discussed herein.

Figure 6:
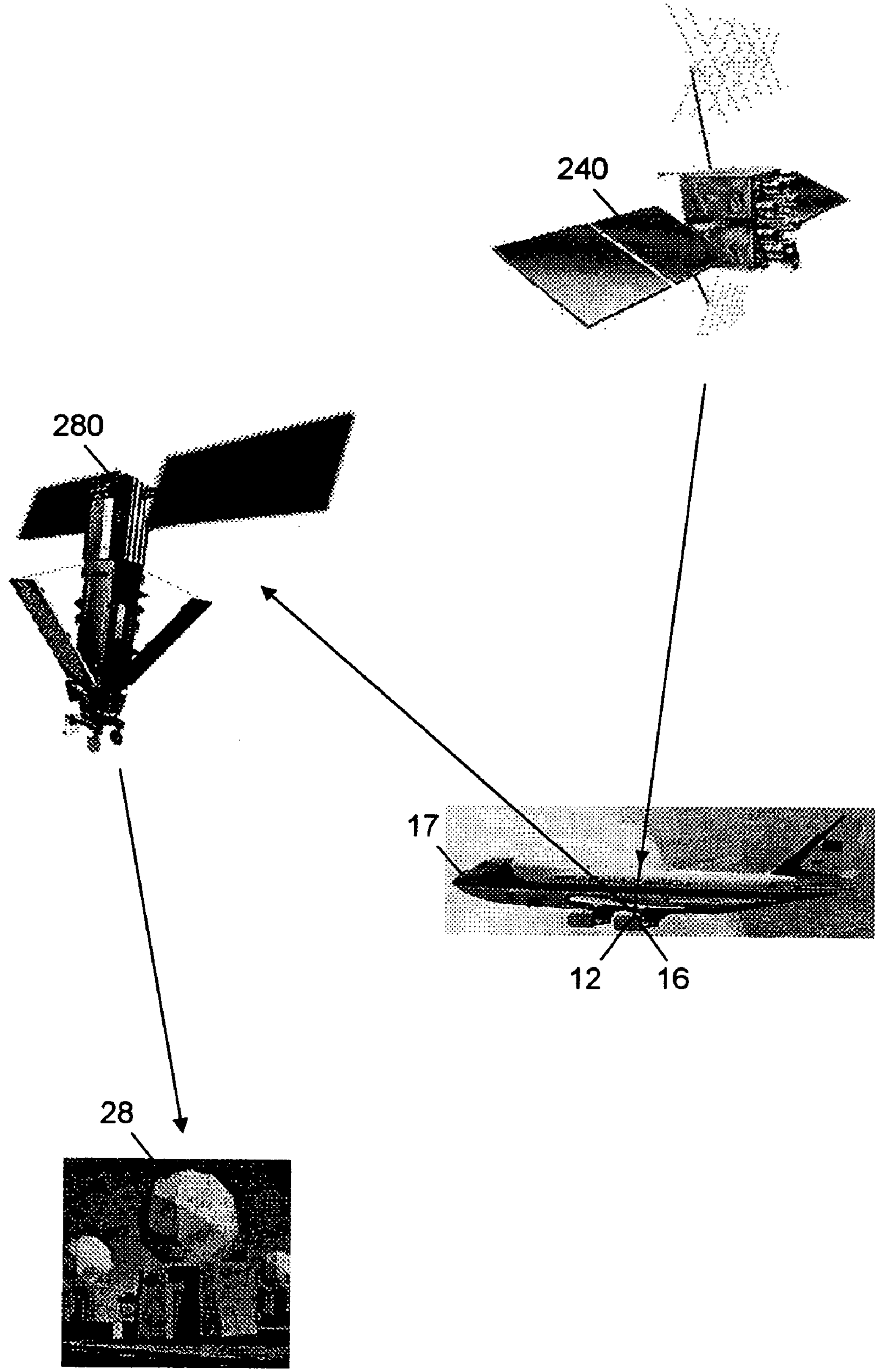
FIG. 6 shows the flow of GPS data in a satellite communication portion of an embodiment of a fuel pump monitoring system.

With reference to FIG. 6, in one embodiment of the fuel pump monitoring system 10, GPS data flows from the GPS satellite 240 to the monitoring device 12 (hidden beneath the cowling surrounding the jet engine) on the fuel pump 16 (also hidden beneath the cowling surrounding the jet engine) on an aircraft 17 (e.g., a jet aircraft). Data transmissions from the monitoring device 12 are relayed by the Iridium satellite 280 to the Iridium satellite/PSTN gateway 28. FIG. 6 particularly notes that the monitoring device sends data to an Iridium satellite which in turn sends this information to a ground station. Moreover, use is shown of GPS satellites providing position and time information to the monitoring device 12.

Figure 7:
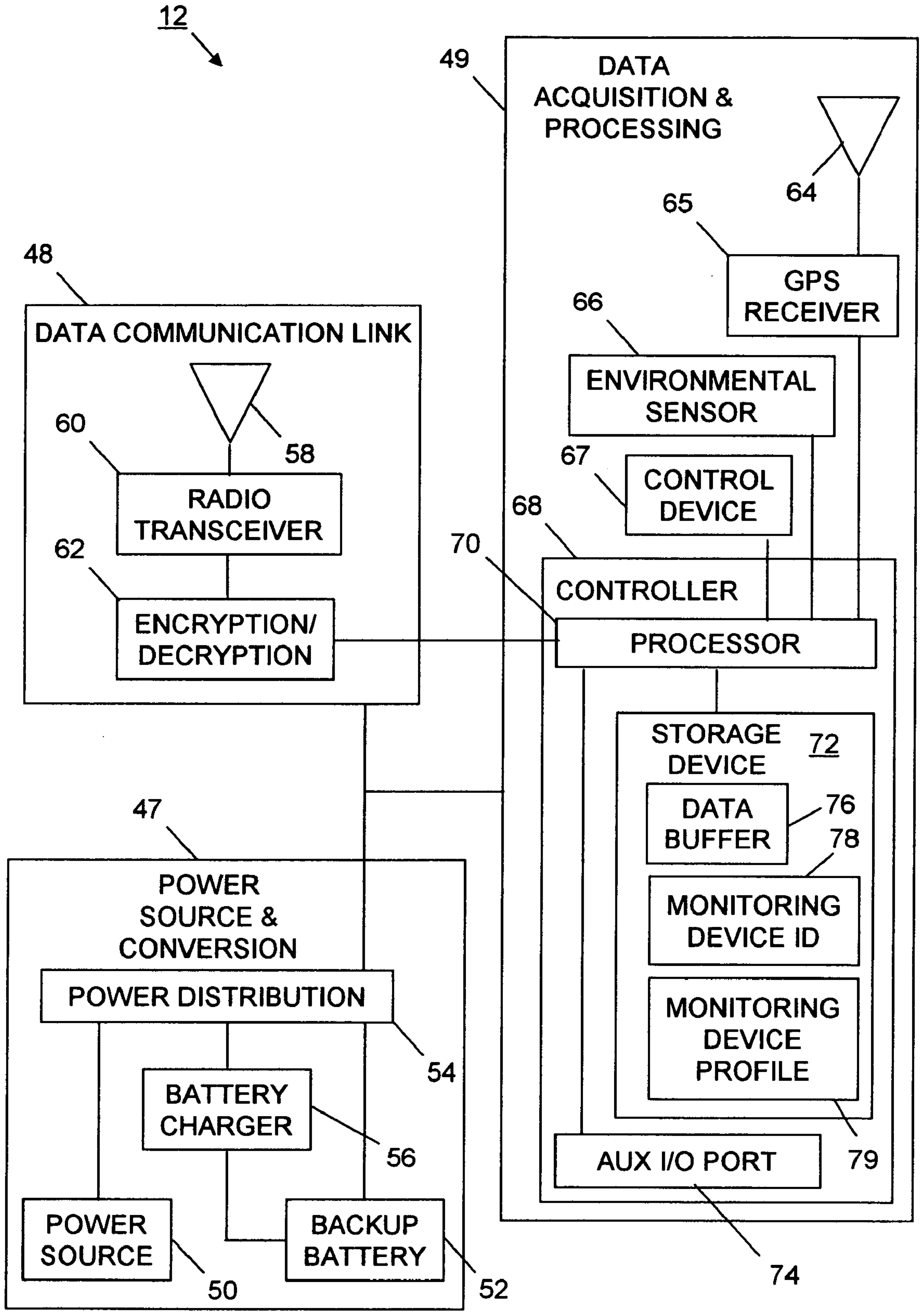
FIG. 7 is a block diagram of an embodiment of a monitoring device.

With reference to FIG. 7, an embodiment of the monitoring device 12 includes a power source and conversion module 47, a data communication link 48, and a data acquisition and processing module 49. The power source and conversion module 47 provides electrical power to the data communication link 48 and the data acquisition and processing module 49. This permits the monitoring device 12 to operate independent of external power sources. The data acquisition and processing module 49 selectively receives sensor data from one or more environmental sensors 66. As an option, the data acquisition and processing module 49 also selectively receives position and time data from GPS satellites 240 (FIG. 3) within line of site of the monitoring device 12 and combines the raw GPS position and time data to form combined position and time data and selectively stores the combined position and time data. The monitoring device 12 also combines the sensor data with the combined position and time data to form fuel pump data and selectively stores the fuel pump data. The data acquisition and processing module 49 selectively communicates the fuel pump data to the data communication link 48. The data communication link 48 selectively transmits the fuel pump data to the fuel pump information server 14 (FIG. 1) via the data communication network 18 (FIG. 1). The data communication link 48 also receives commands and control information from the fuel pump information server 14 (FIG. 1).

In the embodiment being described, the power source and conversion module 47 includes a power source 50, a backup battery 52, a power distribution module 54, and a battery charger 56. The power source 50 provides power to the power distribution module 54. The power source 50 may include any combination of a piezoelectric power generator and a primary battery, as well as other types of suitable power sources. For example, but not limiting the discussion, one may also use fuel cells, hydrogen cells, turbine technology, fly wheel technology and still other power sources capable of reliable operation of monitoring device 12. The power distribution module 54 conditions the power so that suitable power is provided to the various components of the monitoring device 12. The power distribution module 54 distributes power to the battery charger 56, data communication link 48, and data acquisition and processing module 49. The battery charger 56 selectively applies charge current to the backup battery 52. For example, when power from the power source is low, the battery charger 56 may not apply the charge current. The backup battery 52 selectively provides power to the power distribution module 54. For example, when power from the power source is suitable, the backup battery 52 may not provide power to the power distribution module 54.

In alternate embodiments, the power source 50 may be replaced, for example, with an interface to engine power or vehicle power. Moreover, the battery backup 56 and battery charger 52 are optional components in the various embodiments described herein.

In the embodiment being described, the data communication link 48 includes an RF antenna 58, a radio transceiver 60, and an encryption/decryption process 62. The radio transceiver 60 and RF antenna 58 selectively transmit the fuel pump data to the fuel pump information server 14 (FIG. 1) via data communication network 18 (FIG. 1). The RF antenna 58 and radio transceiver 60 also receive commands and control information from the fuel pump information server 14 (FIG. 1). The encryption/decryption process 62 is optional and may encrypt and/or decrypt any type of communication transmitted or received by the monitoring device 12. The encryption/decryption process 62 may encrypt all communications to the fuel pump information server 14 and decrypt all communications from the fuel pump information server 14. Alternatively, the encryption/decryption process 62 may be limited to encrypt the fuel pump data transmitted to the fuel pump information server 14.

In alternate embodiments, where the display device 22 is connected to a port associated with the data acquisition and processing module 49 by wire, the data communication link 48 may be removed. Therefore, the data communication link 48 is an optional component in the various embodiments of the monitoring device 12 described herein.

In the embodiment being described, the data acquisition and processing module 49 includes a GPS antenna 64, a GPS receiver 65, an environmental sensor 66, a control device 67, and a controller 68. The GPS antenna 64 and GPS receiver 65 are optional. If implemented, the GPS antenna 64 and GPS receiver 65 selectively receive position and time data from GPS satellites 240 (FIG. 3) within line of site of the monitoring device 12. The controller 68 combines the raw GPS position and time data to form the combined position and time data and selectively stores the combined position and time data.

The environmental sensor 66 may include any combination of one or more vibration sensors, one or more temperature sensors, one or more strain gauges, and one or more other type of environmental sensor to sense, for example, voltages, pressures, and other quantifiable parameters. The vibration sensors, for example, may be accelerometers. The temperature sensors, for example, may be thermocouples. The environmental sensor 66, for example, senses vibration and provides vibration measurements in the form of sensor data to the controller 68. The controller 68 selectively combines the combines the sensor data with the combined position and time data to form fuel pump data and selectively stores the fuel pump data. The controller 68 also selectively communicates the fuel pump data to the data communication link 48. The controller may compare the vibration measurements with predetermined thresholds to detect various types of events. For example, using the vibration measurements, the controller can detect i) startup of an engine associated with the fuel pump 16 (FIG. 1), ii) shutdown of the engine, iii) start of movement of the vehicle, iv) cessation of movement of the vehicle, v) excessive increase in acceleration of the vehicle, and vi) excessive decrease in acceleration of the vehicle. Typically, the controller 68 selectively stores detected event data along with associated fuel pump data. The environmental sensor 66 may also sense other types of environmental conditions, for example temperature conditions, voltages, pressures, or strain in the surface of the fuel pump, components associated with the fuel pump, or components in the vicinity of the fuel pump.

The controller 68 may use a detected event to determine whether or not the monitoring device 12 should begin receiving the position and time data, begin storing the fuel pump data, and begin transmitting the fuel pump data. For example, the controller 68 can cause the monitoring device 12 to begin receiving position and time data and begin storing fuel pump data when the aircraft takes off, begin transmitting fuel pump data when the aircraft begins to move, stop transmitting after a predetermined period of time, begin transmitting again when the aircraft experiences turbulence, stop transmitting again after a predetermined period of time, stop receiving position and time data when the aircraft stops moving, begin transmitting again when the aircraft stops moving, and stop transmitting when all the stored fuel pump data is transmitted.

The control device 67 is optional and provides for manual startup and shutdown of the monitoring device 12. The control device 67 can be any type of switch or control suitable for its intended purpose. The control device 67 is in communication with the controller 68 and the power source and conversion module 47. Upon a startup activation of the control device 67, the power source 50 is enabled and the controller 68 begins an orderly power up sequence. Upon a shutdown activation, the controller 68 begins an orderly shutdown sequence and, at a suitable time, disables the power source 50.

In the embodiment being described, the controller 68 includes a processor 70, a storage device 72, and an auxiliary input/output (I/O) port 74. The processor is in communication with the GPS receiver 65, environmental sensor 66, control device 67, storage device 72, auxiliary I/O port 74, and data communication link 48. The storage device 72 includes a data buffer 76, a monitoring device identification data 78, and a monitoring device profile 79. The processor 70 receives position and time data from the GPS receiver 65. The processor 70 combines the raw GPS position and time data to form the combined position and time data and selectively stores the combined position and time data in the data buffer 76. The processor 70 receives sensor data from the environmental sensor 66. The processor 70 combines the sensor data with the combined position and time data and selectively stores the resulting fuel pump data in the data buffer 76. The processor 70 selectively communicates the fuel pump data from the data buffer 76 to the data communication link 48.

The processor 70 may include the resolving algorithm described above in reference to FIG. 1. When using the resolving algorithm, the processor 70 may temporarily store the combined position and time data while generating the XYZ or XY data and associated time data. Once the XYZ or XY data and associated time data is generated it is stored in the data buffer 70 and the corresponding raw GPS position and time data is purged. The fuel pump data communicated to the data communication link 48 includes the XYZ or XY data and associated time data instead of the raw GPS position and time data when this option is implemented.

The processor 70 may detect the events associated with, for example, vibration measurements described above. The processor 70 may use the XYZ or XY data to detect additional events related to the position of the fuel pump. The processor 70 compares the XYZ or XY data to predetermined XYZ or XY coordinate limits to detect certain events. For example, the processor 70 may detect when the fuel pump is i) nearing a high stress condition, ii) experiencing a high stress condition, iii) experiencing excessive loss of altitude, iv) experiencing excessive increase in altitude, or v) experiencing unexpected stoppage or significant slow down, or vi) experiencing unexpected speed or significant increase in speed. Additional types of detected events are also possible.

Typically, the processor 70 selectively stores detected event data along with associated combined position and time data and/or associated fuel pump data. Like detected events associated with vibration, the processor 70 may use any of the detected events associated with position and time to determine whether or not the monitoring device 12 should begin receiving the sensor data, storing the fuel pump data, and transmitting the fuel pump data. Additionally, any type of detected event can be included in the fuel pump information provided to the subscriber/client user at the display device 22 (FIG. 1).

The processor 70 receives command and control information from the data communication link 48. The information stored in the monitoring device profile 79 may be predetermined and may be provided in control information. Alternatively, the monitoring device profile 79 may be predetermined and permanently resident in the storage device 72. In another alternative, the monitoring device profile 79, or certain information within the monitoring device profile 79, may be configured and/or edited during operation of the monitoring device 12.

The processor 70 manages data transmissions to the fuel pump information server 14 (FIG. 1) by controlling when the fuel pump data is communicated from the data buffer 76 to the data communication link 48. Typically, the processor 70 controls data transmissions in a burst fashion by waiting for a group of the fuel pump data to accumulate in the data buffer 76. This may be based on commands, control information, and/or the monitoring device profile 79. The processor 70 encodes each transmission burst with monitoring device identification data 78 so that the fuel pump information server 14 can associate the data transmitted with the appropriate monitoring device 12. Event data is typically stored in the data buffer 76. A transmission burst may also include event data associated with the fuel pump data contained in the burst.

In one embodiment, the processor 70 controls the timing between transmission bursts to maintain a virtual private network (VPN) connection over a public data communication system within the data communication network 18 (FIG. 1). For example, the public data communication system may be the Iridium satellite system, a similar satellite system, or any type of wireless telephone system that provides for VPNs. The processor 70 may control the timing between transmission bursts so that the fuel pump monitoring system 10 (FIG. 1) can provide real-time fuel pump information. Alternatively, the processor 70 may control the timing to minimize transmission time over the data communication network. Thus, minimizing communication costs for public telephone networks or other carriers that charge for connect time. As another alternative, the processor 70 may delay transmission bursts until a begin transmitting command is received via the data communication network. Typically, the processor 70 maintains the fuel pump data in the data buffer associated with each transmission burst until an acknowledgment of receipt of the transmission burst is received via the data communication network 18 (FIG. 1).

The auxiliary I/O port 74 is optional and provides a port for directly connecting the display device 22 (FIG. 1) (or any other type of computer device) to the monitoring device 12. The display device, for example, can be used to perform monitoring device maintenance or to download fuel pump data from the data buffer 76. The display device may be a personal computer, a notebook computer, a personal digital assistance, or a similar device.

Figure 8:
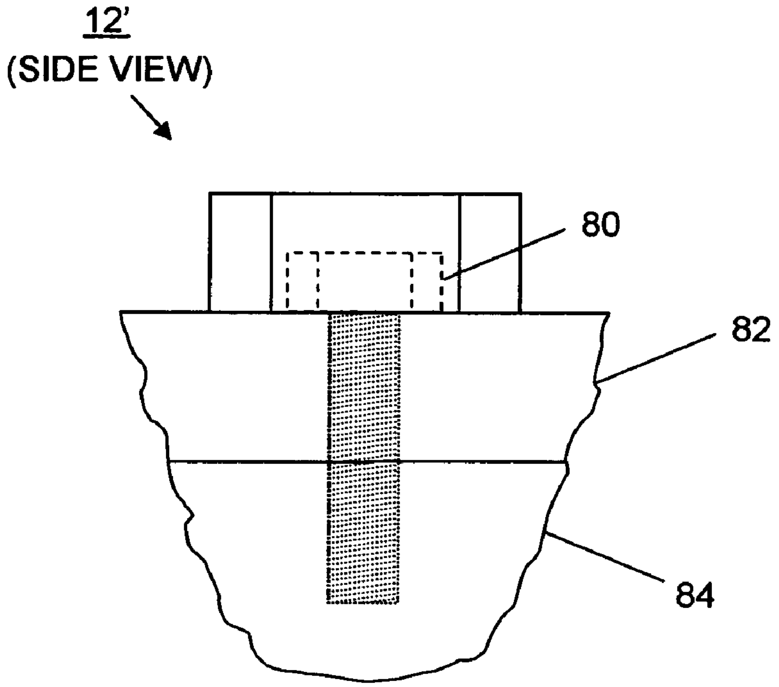
FIGS. 8–9 provide side and top views of an embodiment of the monitoring device.
Figure 9:
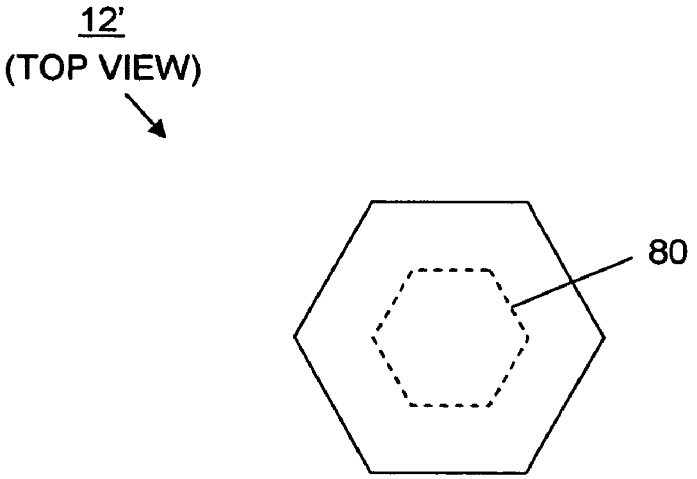

With reference to FIGS. 8–9, one embodiment of the monitoring device 12' is shaped like a hexagon head to a hex-head bolt and fits over the top of the head of a bolt 80 securing a first housing portion 82 of the fuel pump 16 to a second housing portion 84. The monitoring device 12' fits like a cap over the head of the bolt 82. In other embodiments, the bolt 82 may be used to attach alternate components or may merely thread into the fuel pump with no purpose other than to hold the monitoring device 12'. In this type of embodiment, the monitoring device 12' may be a potted and/or sealed component. Notably, in the embodiment being described and various similar embodiments, the monitoring device 12' may be disguised as attaching hardware or a part associated with the fuel pump. This allows for operation of the monitoring device 12' without knowledge of maintenance personal and other personnel associated with the fuel pump and/or vehicle.

Figure 10:
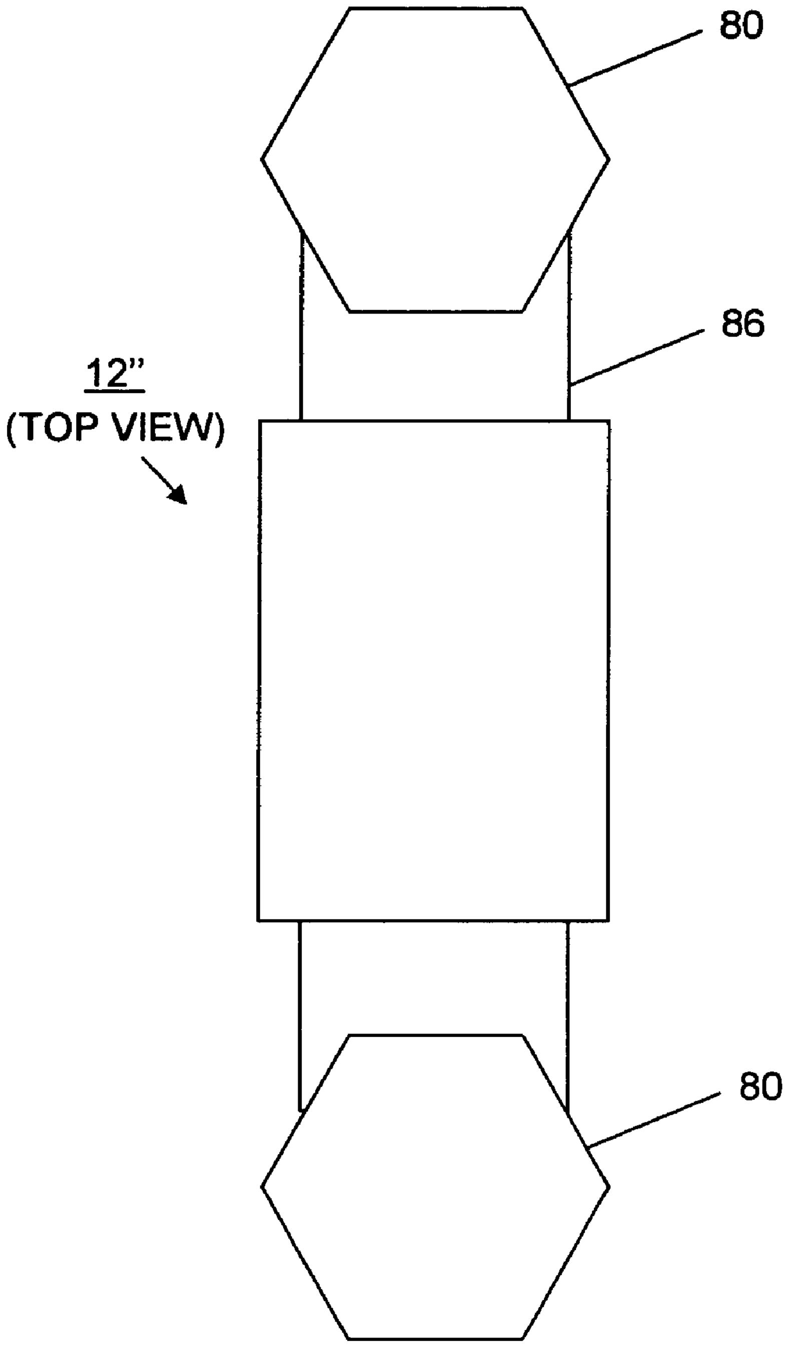
FIG. 10 provides a top view of another embodiment of the monitoring device.

With reference to FIG. 10, another embodiment of the monitoring device 12" is box-shaped and secured to a bridge 84 between two bolts 80 threaded into the fuel pump 16. Like the previous embodiment, the bolts 80 may have another attaching function in addition to securing the bridge 84 with the monitoring device 12" to the fuel pump 16. Again, in this type of embodiment, the monitoring device 12" may be a potted and/or sealed component. Likewise, in this embodiment, the monitoring device 12" may be disguised as a part associated with the fuel pump.

Any other packaging technique suitable for housing the components of the monitoring device and capable of being secured to the fuel pump is also envisioned. Moreover, the monitoring device may be integrally packaged within the housing or other components of the fuel pump. For example, the monitoring device may be disposed within a cavity formed by the fuel pump housing. Furthermore, the monitoring device may be disposed anywhere within a suitable distance from the fuel pump or other vehicle component to be monitored. It is often desirable, but not required, for the monitoring device to be disguised in a manner such that maintenance personnel and other personnel associated with the fuel pump and/or vehicle are not aware that it is present nor aware that it is capable of collecting and communicating data associated with the fuel pump and/or vehicle.

Figure 11:
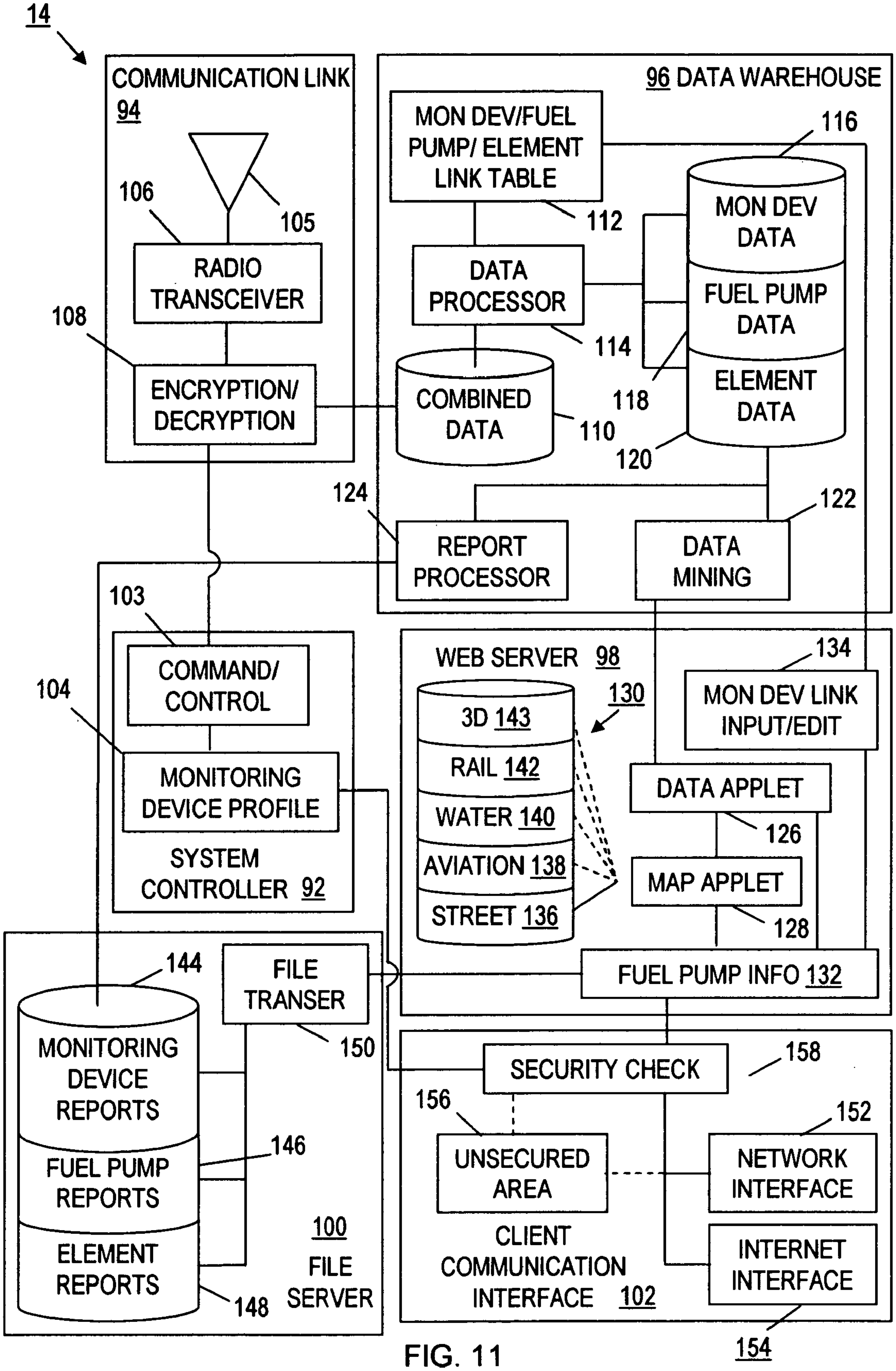
FIG. 11 is a block diagram of an embodiment of a fuel pump information server.

With reference to FIG. 11, an embodiment of the fuel pump information server 14 includes a system controller 92, a communication link 94, a data warehouse 96, a Web server 98, a file server 100, and a client communication interface 102. The communication link 94 selectively provides command and control information to the monitoring device 12 (FIG. 1) and receives the fuel pump data from the monitoring device 12. The data warehouse 96 selectively processes the fuel pump data to form monitoring device data, fuel pump data, and/or element data.

The Web server 98 includes a set of Web pages for displaying fuel pump information. The Web server 98, in conjunction with the data warehouse 96 mining the monitoring device data, fuel pump data, and/or element data, selectively populates one or more of the Web pages with certain fuel pump information for monitoring operational status of the fuel pump 16 (FIG. 1). The Web server 98, in conjunction with the client communication interface 102, selectively makes the fuel pump information accessible to an authorized user of the display device 22 (FIG. 1) via the fuel pump information network 20 (FIG. 1).

The data warehouse 96 may also process the monitoring device data, fuel pump data, and/or element data into monitoring device reports, fuel pump reports, and/or element reports. If report processing is implemented, the monitoring device reports, fuel pump reports, and/or element reports are stored on the file server 100. The Web server 98, in conjunction with the file server 100 and the client communication interface 102, selectively makes the monitoring device reports, fuel pump reports, and/or element reports accessible to an authorized user of the display device 22 (FIG. 1) via the fuel pump information network 20 (FIG. 1).

The Web server 98, in conjunction with the client communication interface 102, may selectively receive links between monitoring device identification data and fuel pumps, as well as associated link information, from an authorized user of the display device 22 (FIG. 1). Likewise, the Web server 98 may selectively receive links between a fuel pump and elements associated with the fuel pump, as well as associated link information, from an authorized user. The data warehouse 96 stores the links and link information collected by the Web server 98 for use during generation of fuel pump data and element data.

The system controller 92 provides overall control of the fuel pump information server 14 and, in conjunction with the communication link 94, control of the monitoring device 12. Overall control may be based on preprogrammed instructions and the monitoring device profile stored in the system controller 92. The preprogrammed instructions includes commands and control information. The monitoring device profile includes control information, as described above. The system controller 92, in conjunction with the client communication interface 102, may selectively receive command and control information from an authorized user of the display device 22 (FIG. 1) to configure and/or edit the preprogrammed instructions and/or the monitoring device profile.

In the embodiment being described, the system controller 92 includes a command and control module 103 and a monitoring device profile 104. The command and control module 103 processes preprogrammed instructions for overall control of the fuel pump information server 14 and, in conjunction with the communication link 94 and the data communication network 18 (FIG. 1), control of the monitoring device 12 (FIG. 1) by communicating commands and control information. Certain parts of overall control may be based on the monitoring device profile 104. The information stored in the monitoring device profile 104 may be predetermined and may be provided in control information. Alternatively, the monitoring device profile 104 may be predetermined and permanently resident. In another alternative, the monitoring device profile 104, or certain information within the monitoring device profile 104, may be configured and/or edited during operation of the fuel pump information server 14 and associated monitoring device 12 (FIG. 1).

In the embodiment being described, the communication link 94 includes an RF antenna 105, a radio transceiver 106, and an encryption/decryption process 108. The RF antenna 105 and radio transceiver 106 and selectively receive the fuel pump data from the monitoring device 12 (FIG. 1) via data communication network 18 (FIG. 1). The radio transceiver 106 and RF antenna 105 also transmit commands and control information to the monitoring device 12 (FIG. 1). The encryption/decryption process 108 is optional and may encrypt and/or decrypt any type of communication transmitted or received by the fuel pump information server 14. The encryption/decryption process 108 may encrypt all communications to the monitoring device 12 and decrypt all communications from the monitoring device 12. Alternatively, the encryption/decryption process 108 may be limited to decrypt the fuel pump data received from the monitoring device 12.

In the embodiment being described, the data warehouse 96 includes a combined position, time, and sensor data storage area 110, a monitoring device/fuel pump/element link table 112, a data processor 114, a monitoring device data storage area 116, a fuel pump data storage area 118, an element data storage area 120, a data mining process 122, and a report processor 124. The combined position, time, and sensor data storage area 110 receives the fuel pump data from the monitoring device (FIG. 1) via the communication link 94.

The monitoring device/fuel pump/link table 112 stores the links and link information collected by the Web server 98. The link from the monitoring device 12 to the fuel pump 16 allows the data processor 114 to associate the fuel pump data with the fuel pump so that fuel pump data may be generated. Similarly, the link from the fuel pump 14 to an element of the fuel pump allows the data processor 114 to associate the fuel pump data with the element so that element data may be generated. Link information is descriptive information that may be associated with a fuel pump or an element. The link information is accessible to the report processor during generation of the fuel pump and element data.

The data processor 114 may include a data decompression process to decompress compressed fuel pump data transmissions. If the fuel pump data includes combined raw GPS position data rather than XYZ or XY data, the fuel pump information server 14 includes the algorithm to resolve position and time data for the associated monitoring device 12 from raw GPS position and time data described above in reference to FIG. 1. The algorithm generates XYZ data representing latitude, longitude, and altitude (requiring position and time data from at least four GPS satellites) or XY data representing latitude and longitude (requiring position and time data from at least three GPS satellites) in the same manner as described above if the resolving algorithm is performed in the monitoring device 12. The algorithm also generates time data associated with XYZ or XY data.

Whether or not the data processor 114 calculates the XYZ or XY data, the data processor 114 may use the XYZ or XY data to detect events related to the position of the fuel pump. The data processor 114 compares the XYZ or XY data to predetermined XYZ or XY coordinate limits to detect certain events. The types of events that can be detected by the data processor 114 based on position include the same examples listed above for the monitoring device 12. Of course, additional types of detected events are also possible. Typically, the detected events are communicated to the system controller 92 so that the system controller 92 can communicate suitable commands in response to the detected event. Typically, the data processor 114 selectively stores detected event data along with associated fuel pump data.

The data processor 114 selectively processes the fuel pump data and link information based on control information from the controller (i.e., preprogrammed instructions and monitoring device profile 104), links from the monitoring device/fuel pump/element link table, and detected events to form monitoring device data, fuel pump data, and/or element data. The monitoring device data is stored in the monitoring device data storage area 116. The fuel pump data is stored in the fuel pump data storage area 118. The element data is stored in the element data storage area 120. The data mining process 122 mines the monitoring device data, fuel pump data, and/or element data based on data required by the Web server 98 to populate one or more of the Web pages with fuel pump information.

The report processor 124 is optional. If report processing is implemented, the report processor 124 selectively processes the monitoring device data into monitoring device reports, the fuel pump data into fuel pump reports, and the element data into element reports. The report processor 124 communicates the monitoring device, fuel pump, and element reports to the file server 100 for storage. For example, the monitoring device reports may include: i) raw GPS position and time data, ii) XYZ position and time data, and iii) detected event data. Other type of monitoring device reports are also possible. For example, the types of fuel pump reports may include: i) environmental parameters associated with the fuel pump, ii) fuel pump log, iii) operation log, and iv) location and time in high stress condition. Other types of fuel pump reports are also possible. For example, the types of element reports may include: i) environmental parameters associated with the element, ii) element log, iii) operation log, and iv) location and time in high stress condition. Other types of element reports are also possible.

Notably, the fuel pump log available from the fuel pump information server 14 may be tailored to operation and maintenance of the fuel pump. Similarly, the operation log may be tailored to reflect accumulative operating hours (i.e., fuel pump “on” time). Another fuel pump report could identify the number of hours the fuel pump has been operated by altitude. For example, if the fuel pump is used on an aircraft, the report may identify the number of hours the fuel pump has been operated above 14,000 feet or pressurized. Moreover, if the element is an aircraft engine, a location and time in high stress condition report can identify the total number of hours the engine has been exposed to high pressure conditions. Another fuel pump report could identify takeoffs and/or landings and associated conditions.

In the embodiment being described, the Web server 98 includes a data applet 126, a map applet 128, a map storage area 130, a fuel pump information module 132, and a monitoring device/fuel pump/element link input/edit module 134. The fuel pump information module 132 includes the set of Web pages. The fuel pump information module 132 presents fuel pump information to an authorized client user at a display device 22 (FIG. 1) via the Web pages in response to client user selections and requests presented via one or more of the Web pages.

The map applet 128 and data applet 126 are web-based programs that respond to selections and requests by an authorized client user. If the GPS position and time data is collected by the monitoring device, the fuel pump information module 132 typically presents fuel pump information via a map retrieved from the map storage area 130, supplemental graphics overlaid on the map by the map applet 128 and supplemental text provided by the data applet 126. The map may be any map that is suitable for the type of vehicle using the fuel pump being monitored. For example, the map storage area 130 may include one or more of a street map 136, an aviation map 138, a water map 140, a rail map 142, and a three-dimensional (3D) environment. Other types of maps may also be provided.

The map applet 128 may default to providing the aviation map 138 and an appropriate Web page for monitoring a fuel pump associated with an aircraft. The Web page may permit the client user to select a different map. If the client user selects a different map, the map applet 128 changes the Web page to the display the selected map. Similarly, the data applet 126 may retrieve certain monitoring device, fuel pump, and/or element data from the data warehouse 96 and provide it to a given Web page by default. The Web page may permit the client user to select additional or different fuel pump information. If so, the data applet 126 responds to client user selections and requests accordingly.

In conjunction with the map and textual position and time fuel pump information, the data applet 126 retrieves XYZ or XY position and time data from the data warehouse 96. The XYZ or XY position data is provided to the map applet 128 and the fuel pump information module 132. The map applet 128 generates an icon representing the XYZ or XY position on the map and overlays it on the map display provided to the fuel pump information module 132. Multiple types of icons may be used, as well as coloring, flashing, and other suitable attributes of the icon, to symbolize certain conditions associated with the fuel pump. Of course, many other features that can be incorporated in Web pages can also be implemented to provide the fuel pump information.

Figure 12:
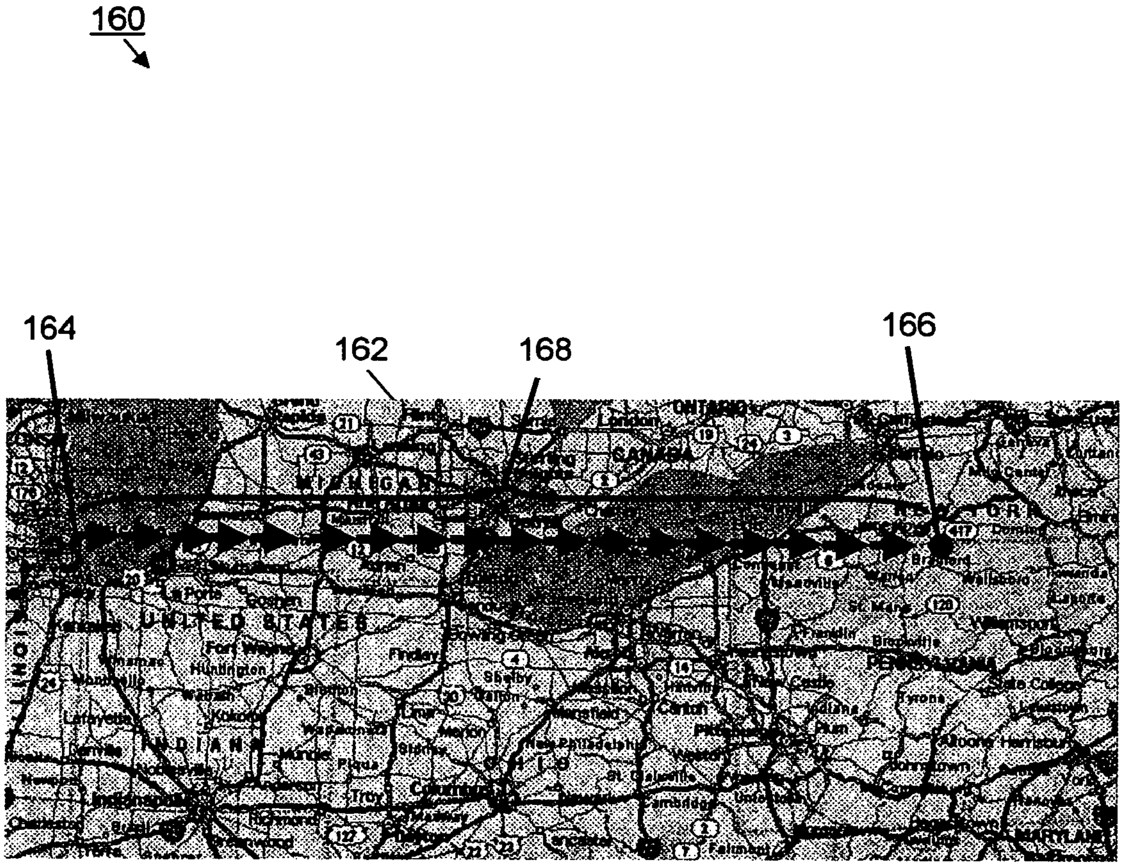
FIG. 12 illustrates an example of a portion of a display device display showing a street map and fuel pump information in accordance with one aspect of the invention.

A sample map with several types of overlaid icons is provided in FIG. 12. While FIG. 12, does not include textual information, the environmental parameters monitored and corresponding XYZ or XY position and time can also be overlaid on the map at a suitable location. Morever, icons and data for additional fuel pumps can be overlaid on the map for monitoring, for example, fuel pumps associated with a fleet of aircraft.

With continuing reference to FIG. 11, the fuel pump information module 132 typically permits panning and zooming of the map display so that the client user can adjust the display to a particular preference. The Web server 98 typically includes one or more Web pages that permit an authorized user to configure links and link information. The monitoring device link input/edit module 134 works in conjunction with the one or more Web pages to collect the link and link information and communicate it to the data warehouse 96. The Web server 98 also typically includes Web pages that permit an authorized user to configure the monitoring device profile 104.

Within the set of Web pages, the client user typically has access to textual information providing an audit trail for a particular monitoring device, fuel pump, and/or element. Notably, the concept of linking fuel pumps to monitoring devices and elements to fuel pumps has the advantage of accumulating historical data for fuel pumps and elements that goes across different monitoring devices and different fuel pumps. For example, if a monitoring device on an fuel pump is replaced for any reason, the link between the fuel pump and monitoring device is updated and the fuel pump data for the fuel pump includes data provided by the initial monitoring device and data provided by the new monitoring device. Thus, historical fuel pump information and reports for the fuel pump can be comprehensive. Similarly, if the engine is an element and the fuel pump happens to be removed from one engine and installed on another engine, the element data for the engine is comprehensive as long as the link between the element and fuel pump is updated.

In the embodiment being described, the file server 100 includes a monitoring device reports storage area 144, a fuel pump reports storage area 146, an element reports storage area 148, and a file transfer module 150. The file transfer module 150 retrieves monitoring device, fuel pump, and/or element reports from the storage area in response to requests for reports from the Web server 98. Typically, this is in response to selections or requests from the client user via a Web page.

In the embodiment being described, the client communication interface 102 includes a network interface 152, an Internet interface 154, an unsecured area 156, and a security check 158. The network interface 152 provides a standard interface to a communication network in the fuel pump information network. For example, the network interface 152 may connect to a LAN, wireless LAN, terrestrial telephone network, satellite system, or any other suitable communication network. The Internet interface 154 provides any type of standard interface to the Internet. Other suitable interfaces to the fuel pump information server 14 are also possible. Preferably, the display device 22 accesses the fuel pump information server via the Internet interface 154.

The unsecured area 156 does not provide fuel pump information. This area requires the client user to perform a login sequence. The login information is provided to the security check 158 to determine whether or not the client user is authorized to enter the Web server for monitoring fuel pump information, to configure the monitoring device profile 104, or configure links and link information. The unsecured area 156 may be Web-based and may contain information describing the fuel pump monitoring system and/or monitoring services.

With reference to FIG. 12, an example of a portion of a display device 22 (FIG. 1) display shows a street map 162. An aircraft departing from Chicago, Ill. 164 and arriving in Jamestown, N.Y. 166 with a fuel pump being monitored. The position of the fuel pump, associated engine, and associated aircraft during the flight is shown by the sequence of arrows pointing from Chicago to Jamestown.

FIG. 12 illustrates a map showing a portion of the United States wherein the arrows from Chicago to Jamestown, N.Y. illustrate the path which would be visually shown to a user having access to the fuel pump monitoring system. This would allow the user to constantly monitor the progress of the fuel pump, engine, or vehicle of interest. It is possible to provide such map monitoring of a fuel pump used on an aircraft, ground vehicle, or watercraft.

Figure 13:
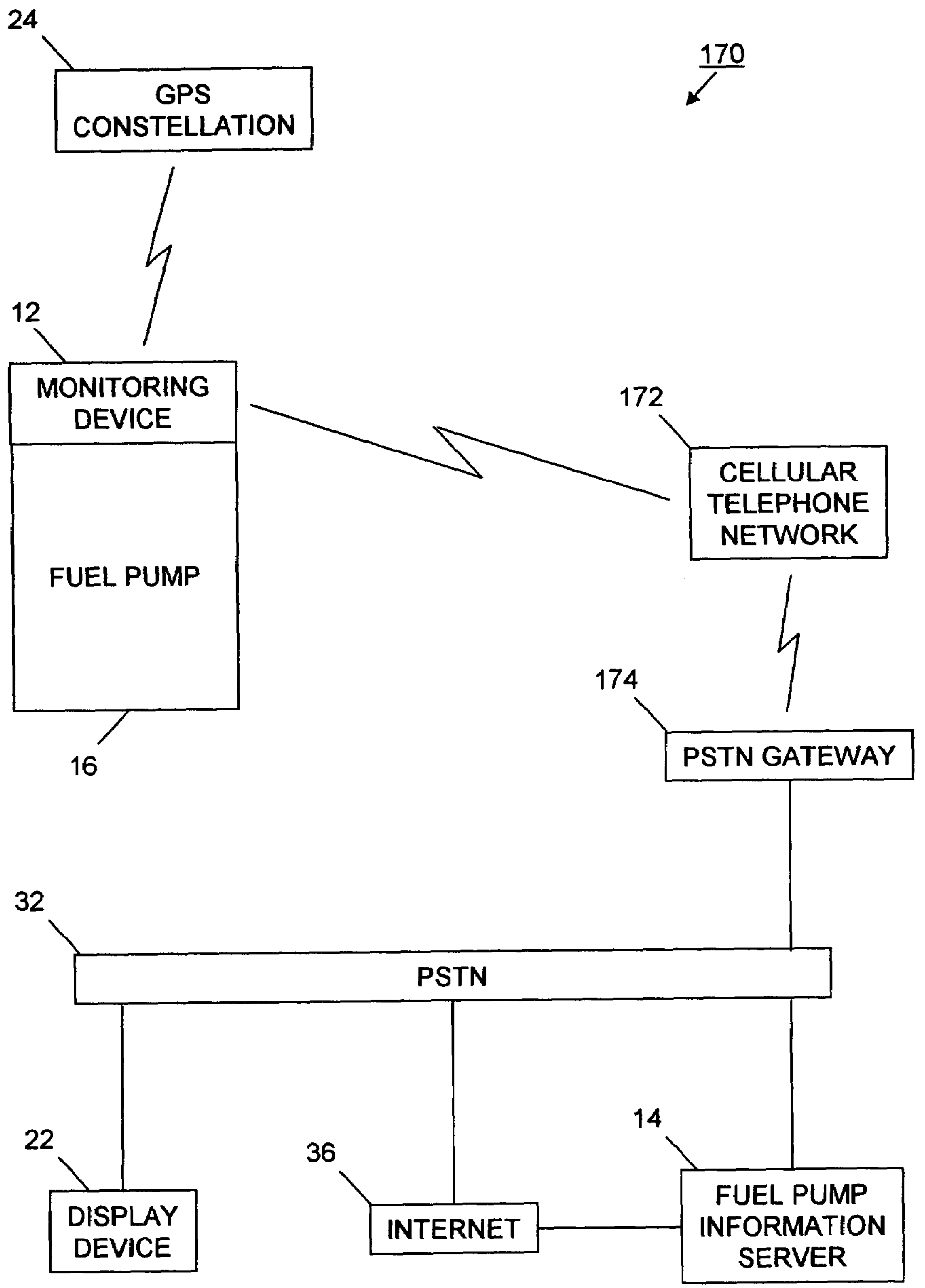
FIG. 13 is a block diagram of an embodiment of a regional fuel pump monitoring system incorporating the invention.

With reference to FIG. 13, an embodiment of a regional fuel pump monitoring system 170 includes the monitoring device 12, the fuel pump information server 14, the fuel pump 16, the display device 22, the GPS satellite constellation 24, the PSTN 32, the Internet 36, a cellular telephone network 172, and a cellular telephone/PSTN gateway 174. The monitoring device 12, fuel pump information server 14, fuel pump 16, display device 22, and GPS satellite constellation 24 are as described above with reference to FIG. 1.

A regional implementation of the fuel pump monitoring system 170 is provided by a data communication network 18 (FIG. 1) and a fuel pump information network 20 (FIG. 1) that provide regional coverage (i.e., regional communications). The data communication network 18 (FIG. 1) is provided by a wireless terrestrial telephone system and a land line terrestrial telephone network. The preferred wireless terrestrial telephone system is a cellular telephone system. However, other wireless terrestrial telephone systems that provide regional coverage may be implemented. The preferred terrestrial telephone network is the PSTN. However, other types of terrestrial telephone networks may be implemented. More specifically, the data communication network 18 (FIG. 1) is provided by the cellular telephone network 172, the cellular telephone/PSTN gateway 174, and the PSTN 32.

In the embodiment being described, the fuel pump information network 20 (FIG. 1) is provided by a terrestrial telephone system and the Internet 36. As shown, the preferred terrestrial telephone system is a land line telephone system. However, other terrestrial telephone systems that provide regional coverage may also be implemented in the regional fuel pump monitoring system 170. More specifically, the fuel pump information network 20 (FIG. 1) is provided by the PSTN 32 and the Internet 36.

Figure 14:
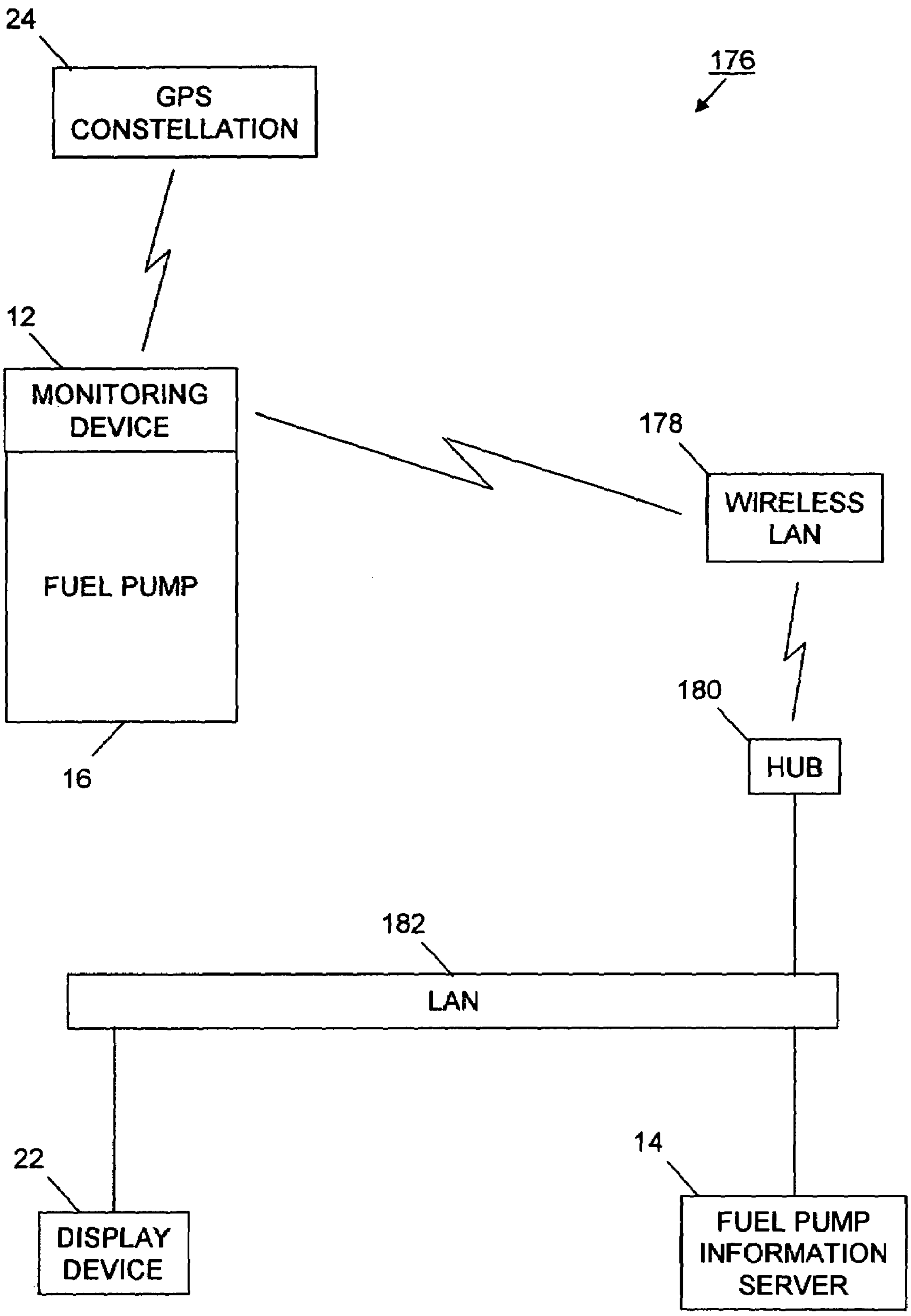
FIG. 14 is a block diagram of an embodiment of a local fuel pump monitoring system incorporating the invention.

With reference to FIG. 14, an embodiment of a local fuel pump monitoring system 176 includes the monitoring device 12, the fuel pump information server 14, the fuel pump 16, the display device 22, the GPS satellite constellation 24, a wireless LAN 178, a wireless LAN/LAN hub 180, and a LAN 182. The monitoring device 12, fuel pump information server 14, fuel pump 16, display device 22, and GPS satellite constellation 24 are as described above in reference to FIG. 1.

A local implementation of the fuel pump monitoring system 176 is provided by a data communication network 18 (FIG. 1) and a fuel pump information network 20 (FIG. 1) that provide local coverage (i.e., regional communications). The data communication network 18 (FIG. 1) is provided by the wireless LAN 178, wireless/wire line LAN hub 180, and wire line LAN 182. However, other local networks suitable for handling wireless data communication are also possible. The fuel pump information network 20 (FIG. 1) is provided by the wire line LAN 182. However, other local networks suitable for handling data communication are also possible.

In summary, in one embodiment, the fuel pump monitoring system (FIGS. 1–2) provides collection of fuel pump data, collection of position and time data, and communication of the data collected. The collection of fuel pump data, for example, includes collection of internal/external vibration frequencies associated with the fuel pump being monitored by a monitoring device (FIGS. 7–10). The collection of location and time data includes, for example, collection of data by a radio receiver associated with the monitoring device. The radio receiver, for example, collects position and time data from satellites of a satellite constellation, such as, but not limited to, the U.S. Department of Defense's (DoD's) global positioning system (GPS) satellite constellation (FIG. 3). Communication of the data collected involves a communication interface between a monitoring device and a display device. The communication interface uses, for example, an Internet-enabled secure service using satellite systems, such as, but not limited to, the Iridium satellite communication system (FIG. 4) to relay control and data signals (e.g., radio frequency (RF) signals) to the display device. The display device interprets the control signals and displays the data signals on a computer-based mapping application or template.

The monitoring device, in combination with the display device, provides users with the ability to monitor the performance of an aircraft fuel pump anywhere in the world. The monitoring device includes the following subsystems: a power source and conversion, a data acquisition and processing, and a data communication interface. The fuel pump monitoring system includes the monitoring device. In one embodiment, the monitoring device is small enough to be attached directly to the side of the fuel pump and nonintrusive to any of the aircraft electrical and mechanical systems. The monitoring device may be attached to one or more bolts securing the aircraft fuel pump to an associated engine or by other known attachment means.

The monitoring device autonomously collects and processes all data as it pertains to the fuel pump and its operating parameters. In one embodiment, a fully integrated GPS receiver within the monitoring device provides positional information so that exact positional parameters are collected. Data is stored within the monitoring device for subsequent interrogation through several well-known storage means. The monitoring device has the provisions to transfer the data at a prescribed maintenance interval by direct contact (e.g., while the aircraft is stationary) or the data can be collected in real time through a remote wireless interface. The wireless interface allows wide or local area connectivity.

The collected fuel pump data may be evaluated to add value to the quality of fuel pump through design upgrades and maintenance support. The fuel pump data collected by the display device is processed and correlated based on customer specific applications. In one embodiment, the display device may be located anywhere in the world. In another embodiment, the display device may include or interface with a centralized file server for storage and/or processing of the fuel pump data. The system collects several types of fuel pump data, including: a) operating time of the fuel pump, c) start and stop times, c) start and stop intervals, d) time and activity audit trails of fuel pump operation, e) frequency and vibration levels in real time which may be communicated when requested, f) GPS monitoring and reporting in real time, including longitude (X), latitude (Y), and altitude (Z) and time when in flight and on the ground, g) monitoring device health, power, errors, transmission data, and retry statistics, and h) independent power source control information.

In one embodiment, the monitoring device may be operated from an aircraft's power system. However, in a preferred embodiment, the monitoring device generates its own power. Thus, the power source and conversion subsystem for the monitoring device may include: a) power provided by the aircraft, b) power generated by vibration, c) power generated by heat, d) power generated by flow through the pump, e) power generated by internal connections to fuel flow, and f) power generated by connection to any mechanical drive.

The data communication link within the monitoring device is designed to provide a communication link to, for example, one or more of the following: a) a wide area global network (e.g., Iridium satellite system), b) a smaller scale wide area network (e.g., wireless data pager subsystem), c) a local area network (e.g, local computer network with wireless LAN), and d) a local display device (e.g, spread spectrum module for direct connection)

In one embodiment, the fuel pump monitoring system may be used to implement a "pay as you go" business model between fuel pump owners or possessors and manufacturers, distributors, or retailers. This involves the precise monitoring of fuel pump data. Such monitoring includes monitoring of on-time, vibration environments and location throughout the world in the X, Y, and Z planes. By logging on-time parameters, it is possible to make a prediction when a fuel pump will fail by the collection of the on-time data of all the operational pumps, and correlating the data for use as a factor in the prediction analysis. A second part of the prediction analysis is exact monitoring of positional data. Flight routes and environmental exposures play a key data element in the prediction of pump failures. Also, knowing where the pump is located provides maintenance crews with information speed up the delivery and repair of pumps.

The fuel pump monitoring system includes a ground-based subsystem, including hardware and software, to acquire, process and store data packets transmitted from the monitoring device. Owners of the ground-based subsystem may allow customers access to fuel pump data according to their predetermined specifications, for example, by subscription or by transaction. The information available to such customers includes discrete carriers, flight types, routes, hours logged, near end-of-life predictions, and environmental extremes. The ground-based subsystem can access or communicate with any monitoring device to have it transmit stored and/or real-time fuel pump data.

Typical prediction methods are based on large-scale sample lots, which is a common statistical tool. Typically, hundreds of thousands of data points are collected for a given monitoring device. Thus, when a large number of monitoring devices are fielded, the monitoring system has access to an extremely large sample population. This permits the prediction method to learn more and more as additional performance data is collected and to adjust its failure predictions and preventive maintenance recommendations accordingly. Classification and other sorting techniques allow for common members, such as routes traveled, cycle times, common altitudes, aircraft types, and other common data modes allow data, to be sorted yielding high orders of like data classifications. Basic statistical processes may be used, benefitting from the extremely large sample populations and high order data classifications available to the monitoring system. Fault predications are simply based on similar profiles of data, which led to a device failure mode. Probability models contain high order coefficients due to large sample populations of data and data sources. The monitoring device may get by with limited computive power because the bulk processing is done at the server by other computers authorized to process the databases. A high probability of accuracy is possible due to the large number of points that can appear in any sample population. Of course, additional prediction methods can be used more or less sophisticated than those described herein.

In one embodiment, the monitoring device includes: a power source and conversion subsystem, a position and time data acquisition module, a fuel pump data acquisition module, a controller, and a data communication link. In one embodiment, the monitoring device is self-contained and operates independent from the aircraft. The monitoring device, other than the mechanical mounting to the fuel pump, requires no modification to the aircraft or altering of existing aircraft systems. In the embodiment being described, power source and conversion subsystem may include either a piezoelectric generator to convert local vibration energy into electrical power or a Peltier device to convert heat energy into electrical power. The electrical power is used to charge a capacitor. Then, when required, the capacitor supplies the necessary electrical power, in a regulated form, to the other components of the monitoring device.

The fuel pump is subjected to constant vibrational energy during operation of the fuel pump and associated engine. Magnitudes and spectral content ensure that there is more than sufficient mechanical energy for the conversion of vibration energy to electrical power. Thus, the piezoelectric powered embodiment generates electrical power during fuel pump operation. As with the vibrational energy, there is sufficient thermal energy from operation of the fuel pump and associated engine to ensure sufficient electrical power is generated to operate the components of the monitoring device.

In one embodiment, the position and time acquisition module includes a GPS receiver capable of detecting standard GPS frequencies. The GPS receiver may include a 12-channel receiver. The receiver processes position and time data transmitted from GPS satellites and converts these RF signals into an X, Y, and Z location data and time for the receiver. If position data is received from at least four GPS satellites, the receiver produces the 3-D X, Y, and Z location data.

In one embodiment, the data communication link includes an uplink radio transceiver configured as a satellite modem. The radio transceiver provides two-way communication access to the monitoring device. Fuel pump health and monitoring device status along with position and time data are combined into a single packet for transmission by the satellite modem to a ground-based receiver (e.g., display device) via the satellite communication system (e.g., Iridium, etc.). The monitoring device may also receive signals from ground-based transmitters or transceivers via the satellite communication system. For example, the ground-based equipment may request data to be transmitted by the monitoring device or instruct the monitoring device to perform maintenance in the form of firmware uploads or status checks. The monitoring device may transmit packet data in response to requests for data, periodically at predetermined intervals, or upon detection of programmed events. Data transmissions by the monitoring device may be continuous and/or in real time or in bursts. This control allows for data to be dumped at predetermined intervals such as at fuel pump start, fuel pump stop, or when its location has changed by a mile or tens of miles. This control allows users to select between minimizing operating costs for the fuel pump monitoring system and performance or timeliness in displaying and/or reporting the data. This is all parametric based and can be changed at any time.

Typically, the data packets are encrypted to ensure the highest level of security and compressed to reduce communication time and/or storage requirements. Again, on-time will be a premium so compression will ensure that the packets are in the smallest most concise form possible. The ground-based receiver interprets the transmitted data and may convert it to Internet-configured data. In other words, inserting or overlaying the data in a pre-established Web page or set of Web pages. Therefore, user access to the transmitted data may be provided via the Internet and/or a smaller scale computer network using a Web browser. Depending on the capabilities of the satellite communication system, the satellite modem may open a remote access session (RAS) and through UDP and TCP/IP protocols issue a data packet to the host for reception by the ground-based receiver.

The fuel pump data acquisition module may include one or more strain gauges, one or more accelerometers, one or more thermocouples, one or more voltage sensors, one or more pressure sensors, and signal conditioning circuits to collect the fuel pump data. Fuel pump data may be collected at predetermined intervals and/or predetermined events and stored in a storage device for subsequent transmission by the data communication link. In one embodiment, the monitoring device is roughly 4" by 3" by 0.5." The monitoring device may be designed and constructed to operate in a −65 to 350 degree Fahrenheit environment. The monitoring device may also be designed and constructed for an operational life of 30,000 hrs.

In the various embodiments described above, the fuel pump monitoring system, individually or in any combination, provides: 1) flight data collection techniques for vibration, locations, and reporting data accumulated in real time or as required by preprogrammed tasking, 2) vibration data recording for accumulating empirical data to predict fuel pump condition and reliability for servicing decision, 3) integration of GPS and fuel pump data collection and data collection techniques with the use of an accelerometer, 4) independent power source for operation of monitoring device for data collection, 5) independent power generation for GPS and data communications techniques, 6) data encryption and data compression techniques for security of display, 7) real-time communication with aircraft using a passive device that is not powered by or under that control of aircraft and staff to report status and location, 8) data for display on pagers, cell phone, and/or wireless PDA computers and accessible over the Internet, 9) a scalable computer technique and design to handle all the data that is being received and displayed via the Internet, pager, cell phone, and/or PDA computer.

In the various embodiments described above, the fuel pump monitoring system, individually or in any combination, also provides: 1) a bolt cap or bridge device easily mounted on an existing fuel pump to record data, 2) a monitoring device capable of recording peak vibration data, temperature data, engine on-time data, quantity of engine on-time cycles, and/or other time-related detail, 3) each monitoring device includes a unique identifier that is transmitted or relayed as part of the data stream, 4) a monitoring device that includes a one wire connection for data retrieval, 5) control of data collection via an external probe, for example, to clear memory and reset the monitoring device and/or to control acquisition parameters, such as interval and time-off states, 6) a monitoring device to withstand temperatures from −55 to 125 degrees Centigrade, and 7) a monitoring device capable of collecting data above and below sea level anywhere on the surface of the Earth.

While the invention has been described in conjunction with exemplary embodiments, it is to be appreciated that many alternatives, modifications and variations will be apparent to those skilled in the art. Accordingly, the embodiments of the invention in the preceding description are intended to be illustrative rather than limiting, of the spirit and scope of the invention. More specifically, it is intended that the invention embrace all alternatives, modifications and variations of the exemplary embodiments described herein.

What is claimed is:

1. An apparatus (10, 26, 170, 176) for monitoring a component (16) associated with a vehicle, including:

a display device (22) external to the vehicle for displaying information associated with the monitoring; and a monitoring device (12) in operative communication with the display device and disposed within an operative vicinity of the component being monitored for selectively sensing at least one environmental parameter associated with the component being monitored and selectively communicating data associated with the monitoring to the display device, wherein the monitoring device is adapted to selectively transmit the data associated with the monitoring to the display device via a data communication network (18) and also adapted to receive command and control information via the data communication network, at least one environmental sensor for selectively sensing the at least one environmental parameter associated with the component being monitored and providing sensor data to the monitoring device, wherein the monitoring device includes the sensor data in the data communicated to the display device, and wherein the display device and the monitoring device are electrically isolated from the vehicle and the component being monitored and inoperative from equipment associated with the vehicle; and a component information server (14) for command and control of the monitoring device, wherein the component information server is adapted to selectively transmit command and control information to the monitoring device via the data communication network, wherein the component information server is adapted to receive the data associated with the monitoring from the monitoring device via the data communication network, wherein the component information server is adapted to selectively receive command and control information from the display device via a component information network (20), wherein the component information server is adapted to selectively process the data associated with the monitoring based on preprogrammed instructions and command and control information to produce the component information associated with the monitoring, wherein the component information associated with the monitoring is selectively accessible to the display device via the component information network; and wherein the preprogrammed instructions include a predetermined monitoring device profile, wherein the component information server is adapted to transmit the preprogrammed instructions to the monitoring device via the data communication network, wherein the monitoring device is adapted to receive the preprogrammed instructions via the data communication network.

2. The apparatus as set forth in claim 1, the component information server including:

a communication link (94) adapted to receive the data associated with the monitoring and monitoring device identification data and transmit the command and control information;

a data warehouse (96) in communication with the communication link for processing the data associated with the monitoring into component data based on a first monitoring device link between the monitoring device identification data and the component being monitored;

a Web server (98) providing a set of Web pages for displaying the information associated with the monitoring, wherein the Web server is in communication with the data warehouse and populates at least one selected Web pages with data mined from the data warehouse;

a client communication interface (102) in communication with the Web server and adapted to selectively provide the display device with access to the information associated with the monitoring; and a system controller (92) in communication with the communication link, the data warehouse, the Web server, and the client communication interface, wherein the system controller stores a predetermined monitoring device profile and controls processing of the data associated with the monitoring into component information using the predetermined monitoring device profile, wherein the system controller is adapted to command the monitoring device and provide the monitoring device with control information using the predetermined monitoring device profile.

3. The apparatus as set forth in claim 2, wherein the data communication network includes a terrestrial telephone network and a data communication satellite system, the data communication satellite system further including a data communication satellite constellation and a data communication satellite/terrestrial telephone gateway in communication with the data communication satellite constellation and the terrestrial telephone network.

4. The apparatus as set forth in claim 3, wherein the terrestrial telephone network is a PSTN (32), the data communication satellite system is an Iridium satellite system, the data communication satellite constellation is an Iridium satellite constellation (28), and the data communication satellite/terrestrial telephone gateway is an Iridium satellite/PSTN gateway (30).

5. The apparatus as set forth in claim 2, wherein the component information network includes an Internet (36) and a data communication satellite system, the data communication satellite system further including a data communication satellite constellation and a data communication satellite/Internet gateway in communication with the data communication satellite constellation and the Internet.

6. The apparatus as set forth in claim 5, wherein the data communication satellite system is an Iridium satellite system, the data communication satellite constellation is an Iridium satellite constellation (28), and the data communication satellite/Internet gateway is an Iridium satellite/Internet gateway (36).

7. The apparatus as set forth in claim 2, wherein the data warehouse produces the component data using the monitoring device identification data and the first monitoring device link and stores the component data.

8. The apparatus as set forth in claim 7, wherein the data warehouse processes the component data according to the predetermined monitoring device profile to produce at least one component report.

9. The apparatus as set forth in claim 8, the component information server further including:

a file server (100) in communication with the data warehouse and the Web server, wherein the data warehouse communicates the component reports to the file server and the file server stores the at least one component report;

wherein at least one Web page includes at least one hypertext link to the at least one component report.

10. The apparatus as set forth in claim 8, wherein the types of component reports include at least one of a group of reports, the group of reports including: i) environmental parameters associated with the component being monitored, ii) component log, and iii) operation log.

11. The apparatus as set forth in claim 2, wherein the data warehouse produces element data using the monitoring device identification data and the first and second monitoring device links and stores the element data, wherein the second monitoring device link identifies a relationship between the component and the element.

12. The apparatus as set forth in claim 11, wherein the element is any one of a group of elements, the group of elements including: an aircraft tail number, an operator, a crew member, a vehicle owner, a fuel pump manufacturer, an engine manufacturer, and a vehicle manufacturer.

13. The apparatus asset forth in claim 11, wherein the component is a fuel pump and the element is an engine.

14. The apparatus as set forth in claim 2, wherein the Web server is adapted to present information associated with the monitoring to an authorized client user via the Web pages and to respond to client user selections and requests presented via the Web pages.

15. The apparatus as set forth in claim 2, wherein the component information server is adapted to communicate with a client user associated with the component via the component information network to configure the first monitoring device link.

16. The apparatus as set forth in claim 2, wherein the first monitoring device link includes monitoring device link information, wherein the monitoring device link information includes at least one of a group of information types, the group of information types including: i) component identification data, ii) component certification, iii) component operational information, and iv) component maintenance information.

17. The apparatus as set forth in claim 1, wherein the preprogrammed instructions include a predetermined monitoring device profile and the component information server is adapted to communicate with a client user associated with the component via the component information network to configure the predetermined monitoring device profile according to predetermined monitoring requirements for the component.

18. The apparatus as set forth in claim 1, wherein the predetermined monitoring device profile includes at least one of a group of control information items associated with the fuel pump, the group of control information items including: i) component information to be monitored and frequency, ii) vibration thresholds associated with startup and shutdown of an engine associated with the vehicle, iii) vibration thresholds associated with normal movement of the vehicle, iv) high stress conditions, v) fuel and fuel consumption information, and vi) reports to be processed and report frequency.

19. An apparatus (10, 26, 170, 176) for monitoring a component (16) associated with a vehicle, including:

a display device (22) external to the vehicle for displaying information associated with the monitoring; and a monitoring device (12) in operative communication with the display device and disposed within an operative vicinity of the component being monitored for selectively sensing at least one environmental parameter associated with the component being monitored and selectively communicating data associated with the monitoring to the display device, wherein the monitoring device is adapted to selectively transmit the data associated with the monitoring to the display device via a data communication network (18) and also adapted to receive command and control information via the data communication network, at least one environmental sensor for selectively sensing the at least one environmental parameter associated with the component being monitored and providing sensor data to the monitoring device, wherein the monitoring device includes the sensor data in the data communicated to the display device, and wherein the display device and the monitoring device are electrically isolated from the vehicle and the component being monitored and inoperative from equipment associated with the vehicle, a data communication link (48) adapted to transmit data via the data communication network and adapted to receive data via the data communication network, a storage device (72) for storing the data associated with the monitoring, a monitoring device identification data, and a predetermined monitoring device profile and a controller (68) in communication with the data communication link and the storage device, wherein the controller controls data transmissions in a burst fashion by waiting for a group of the data associated with the monitoring to accumulate in the storage device based on the predetermined monitoring device profile and commands received via the data communication network, wherein the controller includes the monitoring device identification data in each data transmission burst.

20. The apparatus as set forth in claim 19, wherein the controller controls the timing between transmission bursts to maintain a virtual private network connection over a public data communication system within the data communication network.

21. The apparatus as set forth in claim 20, wherein the public data communication system is the Iridium satellite system.

22. The apparatus as set forth in claim 19, wherein the controller controls the timing between transmission bursts so that the apparatus can provide real-time information associated with the monitoring.

23. The apparatus as set forth in claim 19, wherein the controller controls the timing between transmission bursts to minimize transmission time over the data communication network.

24. The apparatus as set forth in claim 19, wherein the controller delays a transmission burst until a begin transmitting command is received via the data communication network.

25. The apparatus as set forth in claim 19, wherein the controller maintains the combined position and time data in the storage device associated with each transmission burst until an acknowledgment of receipt of the transmission burst is received via the data communication network.

26. An apparatus (10, 26, 170, 178) for monitoring a component (16) associated with a vehicle, including:

a display device (22) external to the vehicle for displaying information associated with the monitoring;

a monitoring device (12) in operative communication with the display device and disposed within an operative vicinity of the component being monitored for selectively sensing at least one environmental parameter associated with the component being monitored and selectively communicating data associated with the monitoring to the display device, wherein the monitoring device is adapted to selectively receive position and time data from multiple global positioning system satellites (240) of a global positioning system satellite constellation (24), the position data representing a position of each global positioning system satellite from which data was received with respect to center of Earth (37) and the time data representing a time of day associated with the position data, the monitoring device being disposed at a location facilitating reception of the position and time data, the monitoring device combining the position and time data from the multiple global positioning system satellites and the sensor data to form the component data associated with the component being monitored, at least one environmental sensor for selectively sensing the at least one environmental parameter associated with the component being monitored and providing sensor data to the monitoring device;

wherein the monitoring device includes the sensor data in the data communicated to the display device; and wherein the display device and the monitoring device are electrically isolated from the vehicle and the component being monitored and inoperative from equipment associated with the vehicle.

27. The apparatus as set forth in claim 26, the monitoring device including:

a global positioning system receiver (65) adapted to selectively receive the position and time data, wherein the monitoring device includes the position and time data in the data communicated to the display device;

a storage device (72) for selectively storing the data associated with the monitoring and detected event data; and a controller (68) in communication with the at least one environmental sensor, global positioning system receiver, and storage device, wherein the controller combines the position and time data received by the global positioning system receiver in a trilateration fashion to produce XYZ and time data when the position and time data was received from at least four global positioning satellites, the XYZ data representing a latitude, a longitude, and an altitude, respectively, and the time data representing a time of day associated with the XYZ data, the combined position and time data including the XYZ and time data, wherein the controller includes the combined position and time data in the data communicated to the display device.

28. The apparatus as set forth in claim 27, wherein the resolution of the XYZ data is about 18 inches in latitude, about 18 inches in longitude, and about 18 inches in altitude.

29. The apparatus as set forth in claim 27, wherein the controller compares the XYZ data to predetermined XYZ coordinate limits to detect at least one of a group of events, the group of events including: i) component being monitored is nearing a high stress condition, ii) component being monitored is experiencing a high stress condition, iii) component being monitored is experiencing excessive loss of altitude, iv) component being monitored is experiencing excessive increase in altitude, and v) fuel pump is experiencing unexpected stoppage/slow down.

30. The apparatus as set forth in claim 29, wherein the at least one environmental sensor begins sensing the at least one environmental parameter, the global positioning system receiver begins receiving the position and time data, and the controller begins storing the data associated with the monitoring and the detected event data in the storage device when at least one of the group of events is detected.

31. The apparatus as set forth in claim 29, wherein the monitoring device begins transmitting the data associated with the monitoring and the detected event data from the storage device when at least one of the group of events is detected.

32. The apparatus as set forth in claim 27, wherein the at least one environmental sensor begins sensing the at least one environmental parameter, the global positioning system receiver begins receiving the position and time data, and the controller begins storing the data associated with the monitoring and the detected event data in the storage device when a command to begin receiving is received via the data communication network.

33. The apparatus as set forth in claim 27, wherein the monitoring device begins transmitting the data associated with the monitoring and the detected event data from the storage device when a command to begin transmitting is received via the data communication network.

34. The apparatus as set forth in claim 26, wherein the monitoring device is disposed and oriented on the component so that the monitoring device can receive position and time data from multiple global positioning system satellites during normal operation of the vehicle.

35. A fuel pump monitoring system (10, 26, 170, 176), including:

a display device (22) for displaying fuel pump information associated with a fuel pump (16) to be monitored, wherein the fuel pump is used in conjunction with a vehicle;

a fuel pump information network (20) in communication with the display device for communicating the information to the display device;

a data communication network (18);

a monitoring device (12) disposed within an operative vicinity of the fuel pump for selectively sensing at least one environmental parameter associated with the fuel pump for selectively transmitting data associated with the fuel pump via the data communication network, wherein the monitoring device receives command and control information via the data communication network; and a fuel pump information server (14) for command and control of the monitoring device, wherein the fuel pump information server selectively transmits command and control information to the monitoring device via the data communication network, wherein the fuel pump information server receives the data associated with the fuel pump from the monitoring device via the data communication network, wherein the fuel pump information server selectively receives command and control information from the display device via the fuel pump information network, wherein the fuel pump information server selectively processes the data associated with the fuel pump to produce the fuel pump information, wherein the fuel pump information is selectively accessible to the display device via the fuel pump information network, wherein the monitoring device is adapted to selectively receive position and time data from multiple global positioning system satellites (240) of a global positioning system satellite constellation (24), the position data representing a position of each global positioning system satellite from which data was received with respect to center of Earth (37) and the time data representing a time of day associated with the position data, the monitoring device disposed and oriented to facilitate reception of the position and time data, the monitoring device combining the position and time data from the multiple global positioning system satellites with the sensor data to form the data associated with the fuel pump.

36. The fuel pump monitoring system as set forth in claim 35, wherein the monitoring device is electrically isolated from the fuel pump and inoperative from equipment associated with the fuel pump.

37. The apparatus as set forth in claim 35, the monitoring device including:

an environmental sensor (66) for sensing at least one of vibration, temperature, and surface strain associated with the fuel pump;

a storage device (72) for selectively storing the sensor data and detected event data; and a controller (68) in communication with the environmental sensor and storage device, wherein the controller compares vibration measurements from the environmental sensor with predetermined thresholds to detect at least one of a group of events, the group of events including: i) startup of an engine associated with the fuel pump, ii) shutdown of the engine, iii) start of movement of the vehicle, iv) cessation of movement of the vehicle, v) excessive increase in acceleration of the vehicle, and vi) excessive decrease in acceleration of the vehicle, wherein the controller selectively stores the sensor data and the detected event data in the storage device.

38. The apparatus as set forth in claim 35, wherein the data communication network includes a land line terrestrial telephone network and a wireless terrestrial telephone system, the wireless terrestrial telephone system further including a wireless terrestrial telephone network and a wireless terrestrial telephone/land line terrestrial telephone gateway in communication with the wireless terrestrial telephone network and the land line terrestrial telephone network.

39. The apparatus as set forth in claim 35, wherein the data communication network includes a wireless LAN (178), a wire line LAN (182), and a wireless/wire line LAN hub (180) in communication with the wireless LAN and the wire line LAN (182).

40. The apparatus as set forth in claim 35, wherein the component information network includes an Internet (34) and a land line telephone network in communication with the Internet.

41. The apparatus as set forth in claim 35, wherein the component information network includes a wire line LAN (180).

42. A method for monitoring a fuel pump associated with a vehicle and providing fuel pump information to a subscriber, including the steps:

a) associating the subscriber with a monitoring device and the monitoring device with the fuel pump, wherein the monitoring device is disposed in an operative vicinity of the fuel pump at a location in which the monitoring device can receive position and time data from multiple global positioning system satellites and sense at least one environmental parameter associated with the fuel pump during normal operation of the vehicle, wherein the monitoring device is electrically isolated from the vehicle and the fuel pump and inoperative from equipment associated with the vehicle;

b) granting the subscriber using a display device access to a Web site via a component information network, wherein the Web site includes at least one fuel pump information Web page that displays a map suitable for monitoring environmental parameter, position, and time data associated with the fuel pump;

c) receiving position and time data from at least four global positioning system satellites of a global positioning system satellite constellation at the monitoring device, the position data representing a position of each global positioning system satellite from which data was received with respect to center of Earth and the time data representing a time of day associated with the position data;

d) sensing at least one environmental parameter associated with the fuel pump;

e) communicating the environmental parameter, position, and time data to a component information server via a data communication network;

f) processing the position and time data in a trilateration fashion to produce XYZ and time data, the XYZ data representing a latitude, a longitude, and an altitude, respectively, and the time data representing a time of day associated with the XYZ data;

g) displaying the environmental parameter, XYZ, and time data on the at least one Web page and overlaying a symbol on the map at a coordinate associated with the XYZ data; and h) repeating steps c) through g) for a predetermined time at a predetermined interval.

43. The apparatus as set forth in claim 42, wherein the data communication network includes a PSTN, an Iridium satellite constellation, and an Iridium satellite/PSTN gateway in communication with the PSTN and the Iridium satellite constellation, wherein the monitoring device is in communication with the Iridium satellite constellation and the tracking information is displayed to the subscriber at the display device when the fuel pump is substantially anywhere in the world with line of sight access to the sky.

44. The apparatus as set forth in claim 42, wherein the component information network includes an Internet, an Iridium satellite constellation, and, an Iridium satellite/Internet gateway in communication with the Internet and the Iridium satellite constellation, wherein the display device is in communication with the Iridium satellite constellation and the tracking information is displayed to the subscriber at the display device when the subscriber is substantially anywhere in the world.

* * * * *